US009819119B2

(12) United States Patent
Kern et al.

(10) Patent No.: US 9,819,119 B2
(45) **Date of Patent: *Nov. 14, 2017**

(54) CABLE ASSEMBLY BACKSHELL

(71) Applicant: R. Kern Engineering & Manufacturing Corp., Chino, CA (US)

(72) Inventors: Richard J. Kern, Evergreen, CO (US); Nolan C. Budd, Chino, CA (US); Matthew Guthrie Camarillo, Chino, CA (US)

(73) Assignee: R. Kern Engineering & Manufacturing Corp., Chino, CA (US)

( * ) Notice: Subject to any disclaimer, the term of this patent is extended or adjusted under 35 U.S.C. 154(b) by 122 days.

This patent is subject to a terminal disclaimer.

(21) Appl. No.: 14/822,207

(22) Filed: Aug. 10, 2015

(65) Prior Publication Data

US 2015/0349455 A1 Dec. 3, 2015

Related U.S. Application Data

(63) Continuation of application No. 14/158,236, filed on Jan. 17, 2014, now Pat. No. 9,118,158.
(Continued)

(51) Int. Cl.
*H02G 3/18* (2006.01)
*H01R 13/58* (2006.01)
(Continued)

(52) U.S. Cl.
CPC ........... *H01R 13/58* (2013.01); *H01R 13/506* (2013.01); *H01R 13/533* (2013.01);
(Continued)

(58) Field of Classification Search
CPC .. H02G 3/22; H02G 3/00; H02G 3/02; H02G 3/24; H02G 3/065; H02G 3/0675; H02G 3/088; H02G 3/0625; H02G 15/013; H02G 15/007; H02G 15/046; H02G 15/00; H02G 15/04; H01R 13/565; H01R 13/5841; H01R 13/58; H01R 13/506; H01R 13/533; H01R 13/6581; H01R 43/00; H01R 43/26;
(Continued)

(56) References Cited

U.S. PATENT DOCUMENTS 3,546,658 A 12/1970 Van Horssen et al.
3,675,184 A 7/1972 Vetter
(Continued)

FOREIGN PATENT DOCUMENTS

DE 3809471 9/1988
EP 0156075 10/1985
(Continued)

OTHER PUBLICATIONS

Notice of Allowance for U.S. Appl. No. 14/158,236, dated Apr. 23, 2015, 11 pages.

*Primary Examiner* — Angel R Estrada
(74) *Attorney, Agent, or Firm* — Sheridan Ross PC

(57) ABSTRACT

Provided is a cable assembly backshell capable of three angular configurations: straight, 45°, and 90°. The backshell is designed to rotate at two joints that allow it to assume these three angular configurations. A locking mechanism is associated with the backshell which prevents unintended reconfigurations.

20 Claims, 15 Drawing Sheets

Related U.S. Application Data

(60) Provisional application No. 61/754,072, filed on Jan. 18, 2013.

(51) Int. Cl.
*H01R 43/00* (2006.01)
*H01R 13/6581* (2011.01)
*H01R 13/533* (2006.01)
*H01R 43/26* (2006.01)
*H01R 13/506* (2006.01)

(52) U.S. Cl.
CPC ..... *H01R 13/5841* (2013.01); *H01R 13/6581* (2013.01); *H01R 43/00* (2013.01); *H01R 43/26* (2013.01); *Y10T 29/4921* (2015.01); *Y10T 29/49174* (2015.01); *Y10T 29/49176* (2015.01); *Y10T 29/49208* (2015.01)

(58) Field of Classification Search
CPC ......... Y10T 29/49174; Y10T 29/49176; Y10T 29/49208; Y10T 29/4921
USPC ... 174/650, 655, 135, 653, 651, 652, 137 R, 174/74 R, 142, 152 G; 385/134, 135; 277/602, 603, 608; 248/56, 73; 439/170, 439/173, 446, 905, 576
See application file for complete search history.

(56) References Cited

U.S. PATENT DOCUMENTS

| | | | |
|---|---|---|---|
| 3,678,439 | A | 7/1972 | Vetter |
| 3,678,446 | A | 7/1972 | Siebelist |
| 3,784,233 | A | 1/1974 | Hilbert |
| 3,944,317 | A | 3/1976 | Oberdiear |
| 4,583,809 | A | 4/1986 | Werth et al. |
| 4,666,242 | A | 5/1987 | Cairns |
| 4,671,598 | A | 6/1987 | Keehne |
| 4,676,573 | A | 6/1987 | Norman |
| 4,808,123 | A | 2/1989 | Dee et al. |
| 4,834,667 | A | 5/1989 | Fowler et al. |
| 4,863,396 | A | 9/1989 | Johnson |
| 4,962,991 | A | 10/1990 | Carvalho |
| 5,018,822 | A | 5/1991 | Freismuth et al. |
| 5,046,964 | A | 9/1991 | Welsh et al. |
| 5,064,226 | A | 11/1991 | Klas |
| 5,102,351 | A | 4/1992 | Meshel |
| 5,192,219 | A | 3/1993 | Fowler et al. |
| 5,211,576 | A | 5/1993 | Tonkiss et al. |
| 5,521,998 | A | 5/1996 | Walles et al. |
| 5,580,278 | A | 12/1996 | Fowler et al. |
| 5,775,948 | A | 7/1998 | Madeley |
| 5,788,528 | A | 8/1998 | Orr, Jr. et al. |
| 5,795,175 | A | 8/1998 | Barr |
| 5,817,980 | A | 10/1998 | Kirma |
| 5,823,811 | A | 10/1998 | Blanchfield et al. |
| 6,048,224 | A | 4/2000 | Kay |
| 6,146,204 | A | 11/2000 | Lazaro, Jr. |
| 6,196,865 | B1 | 3/2001 | Ruffel et al. |
| 6,419,519 | B1 | 7/2002 | Young |
| 6,514,104 | B1 | 2/2003 | Lazaro, Jr. |
| 6,561,549 | B1 | 5/2003 | Moris et al. |
| 6,634,896 | B1 | 10/2003 | Potega |
| 6,846,201 | B2 | 1/2005 | Lazaro, Jr. |
| 6,932,390 | B1 | 8/2005 | Gretz |
| 6,981,895 | B2 | 1/2006 | Potega |
| 6,986,683 | B2 | 1/2006 | Lazaro, Jr. |
| 7,033,193 | B2 | 4/2006 | Higgins et al. |
| 7,247,056 | B2 | 7/2007 | Zauber |
| 7,419,402 | B2 | 9/2008 | Carnahan et al. |
| 7,438,579 | B1 | 10/2008 | Pellen |
| 7,641,504 | B1 | 1/2010 | Padruzzi |
| 7,837,495 | B2 | 11/2010 | Baldwin et al. |
| 7,862,369 | B2 | 1/2011 | Gimenes et al. |
| 7,997,923 | B1 | 8/2011 | Oh et al. |
| 8,007,319 | B2 | 8/2011 | Dang |
| 8,109,787 | B1 | 2/2012 | Kun-Tse |
| 8,162,697 | B1 | 4/2012 | Menolotto et al. |
| 8,262,408 | B1 | 9/2012 | Kelly |
| 8,430,686 | B2 | 4/2013 | Sheehan et al. |
| 8,435,066 | B2 | 5/2013 | Myong et al. |
| 9,118,158 | B2 * | 8/2015 | Kern ..................... H01R 43/00 |
| 2003/0186592 | A1 | 10/2003 | Potega |
| 2003/0207603 | A1 | 11/2003 | Potega |
| 2007/0037433 | A1 | 2/2007 | Carnahan |
| 2007/0149064 | A1 | 6/2007 | Johnson et al. |
| 2008/0026641 | A1 | 1/2008 | Zauber et al. |
| 2012/0052746 | A1 | 3/2012 | Hsu |
| 2013/0157506 | A1 | 6/2013 | Grek et al. |
| 2014/0265308 | A1 | 9/2014 | Reilly et al. |

FOREIGN PATENT DOCUMENTS

| | | |
|---|---|---|
| EP | 0334609 | 6/1994 |
| EP | 0632537 | 4/1999 |
| EP | 2053701 | 11/2012 |
| FR | 2864713 | 7/2005 |
| GB | 1369064 | 10/1974 |
| GB | 2427081 | 12/2006 |
| WO | WO 98/28822 | 7/1998 |
| WO | WO 2008/145878 | 12/2008 |
| WO | WO 2011/071869 | 6/2011 |

* cited by examiner

CABLE ASSEMBLY BACKSHELL

CROSS-REFERENCE TO RELATED PUBLICATIONS

This application is a Continuation application and claims the benefit and priority of U.S. application Ser. No. 14/158,236, filed Jan. 17, 2014, which claims the benefit of U.S. Provisional Patent Application Ser. No. 61/754,072, filed Jan. 18, 2013, the entire disclosure of each of which is incorporated by reference herein.

FIELD OF THE INVENTION

The embodiments of the present invention generally relate to backshell connectors used to interconnect a cable, wire, or fiber optic cable to an electrical component. One embodiment of the present invention is a cable assembly backshell having a connector piece, a union piece, and a cable entry piece.

BACKGROUND

Connectors that interconnect a cable, wire, or fiber optic cable to an electrical component frequently include a backshell. Those of skill in the art will appreciate that a "backshell" is a rear portion of a connector, which is normally separate from a connector head that interfaces with the electronic component. Backshells are used to secure the cable via a clamp to the end of the connector. More specifically, a connector backshell is designed to be placed around that portion of a connector (the "plug" or "receptacle") which contains the facilities for attaching wires or cables. A backshell may be designed to provide the necessary accommodations between an electrical cable clamping device and an electrical connector shell, or the backshell may include the clamping device. A backshell may also be used for shielding against electrical interference, mechanical injury, or physical damage due to environmental conditions. Some backshells include a strain-relieving cable clamp to secure the cable to the backshell and connector, which prevents the cable from separating from the backshell.

Backshells are used with copper cable, copper wire, or fiber optic cable connectors. Some backshells can be angled to orient a cable at a predetermined angle to the face of the electrical component to which the cable is interconnected. Angled backshells provide separation between different cables, accommodate using connectors in tight spaces, reduce stain on the cables, and reduce inadvertent movement or bending of the cables. Angled backshells are generally provided in three standard configurations: 0°, 45°, and 90°. These three standard configurations have been found to accommodate most design requirements for connections between a connector and an electrical component. However, angled backshells produced in these standard configurations are generally not interchangeable which limits their usefulness. Further, suppliers must stock backshells for each type of connector (copper cable or fiber optic cable) and entry angle, which increases inventory costs and storage space requirements. Contractors must also calculate and obtain the required amount of each type of angled backshell, which requires storing and controlling each type of backshell. Technicians working with the backshells must maintain backshells of each type at the job site. If an insufficient number of a backshell of a particular angular configuration are ordered by the contractor, or if the technician exhausts a backshell supply of one angular configuration, work may stop until the more required backshells are delivered.

Several types of backshells have been designed to address these issues and to provide a backshell that may be used for multiple types of connectors and cable angle entry. One design includes adapters made of semi-circular sections formed in various angles. An example of this type of connector is provided in U.S. Pat. No. 3,944,317, which is incorporated herein by reference in its entirety. Although the adapter of this design may allow the backshell to be used in various angles, the design further complicates inventory and control problems by using small, loose adapters of various angles and sizes. Further, the small adapters can be inadvertently introduced into the electrical component by the technician, which may cause damage to the component. Identification and removal of misplaced adapters from electrical components can be difficult and time consuming, further negatively impacting efficiency.

Other backshells can pivot to various angles. Examples of pivoting backshells are provided in U.S. Pat. Nos. 7,419,402, 7,862,369, and 7,997,923, which are incorporated herein by reference in their entireties. Backshells of these designs have a pivot point used to adjust the angle of the backshell. However, when the backshell is pivoted, the contained cable may be bent sharply and therefore these pivoting backshells may not be suitable for use with some types of cables. In addition, these backshells only articulate in one plane, which limits their use. The backshells also fail to fully protect the cable which may be exposed within the pivot arms unless a separate shield is utilized over this area.

A design with a rotatable body is described in U.S. Pat. No. 8,435,066, which is herein incorporated by reference in its entirety. This backshell has a rotatable joint that can be used to position the ends of the backshell at various angles to each other. However, because this backshell has only one rotating joint, some intended cable installations may not be possible. The backshell also has many exposed edges proximate to the rotatable joint that could damage a cable. Therefore, this rotating backshell is not suitable for some types of electrical or fiber optic cables.

Accordingly, there is an unmet need for a cable assembly backshell that improves efficiency of usage through reduced inventory, has no loose parts, is easy to adjust and reconfigure in the field, and is substantially sealed to provide environmental and radio frequency protection.

SUMMARY OF THE INVENTION

Embodiments of the present invention contemplate a novel cable assembly backshell that has two rotatable joints. Thus, efficiency is improved by reducing inventory requirements as the backshell can be reconfigured and adjusted in the field to fit several standard angular configurations. The cable assembly backshell is generally comprised of a connector piece, a cable entry piece, and a union piece that interconnects the connector and cable entry pieces. The connector piece and the cable entry piece each have one end angled at approximately 22.5° and one straight end. The union piece has two ends angled at approximately 22.5°. The angled ends of the connector piece and the cable entry piece are each rotatably interconnected to the angled ends of the union piece to form two rotatable joints. By rotating the connector piece and the cable entry piece, the straight ends of the backshell can be positioned in four configurations: a straight configuration, two 45° configurations, and a 90° configuration. The present invention also generally relates to other areas of the electrical connection field such as d-subminiature connectors and other rectangular connector fields that may utilize the multi-angular connectors of the present invention.

A locking mechanism is included to prevent inadvertent or unintended reconfiguration of the backshell. The locking mechanism is contained by the union piece to prevent movement of the locking mechanism when it is in a locked position. It is another aspect of embodiments of the present invention to provide smooth angle transitions for fiber optic cable and copper cables with maximum bending radii requirements. The internal surfaces of the backshell have no sharp edges that could damage a cable in the backshell.

It is one aspect of embodiments of the present invention to provide a cable assembly backshell having no loose parts or components that may be dropped or lost, which reduces or eliminates foreign object damage to electrical components. The cable assembly backshell can easily be reconfigured in the field with an adapter to adjust from copper to fiber optic connector types and vice versa on both the connector piece and the cable entry piece.

In one embodiment, a rotatable cable assembly backshell is provided. The rotatable cable assembly backshell includes a connector piece with a first cylindrical body extending along a first longitudinal axis. The first cylindrical body has a first hollow interior and a first end oriented at an angle of approximately 90 degrees to the first longitudinal axis and a second end oriented at an angle of approximately 67.5 degrees to the first longitudinal axis. The first end is adapted to interconnect with a cable connector or connector head. The rotatable cable assembly backshell further includes a union piece with a second cylindrical body extending along a second longitudinal axis. The second cylindrical body has a second hollow interior and a third end oriented at an angle of approximately 67.5 degrees to the second longitudinal axis, the third end interconnected to the second end of the connector piece at a first rotatable joint. The second cylindrical body of the union piece has a fourth end oriented at an angle of approximately 112.5 degrees to the second longitudinal axis. The rotatable cable assembly backshell further includes a cable entry piece having a third cylindrical body extending along a third longitudinal axis. The third cylindrical body has a third hollow interior and a fifth end oriented at an angle of approximately 112.5 degrees to the third longitudinal axis, the fifth end interconnected to the fourth end of the union piece at a second rotatable joint. The third cylindrical body further includes a sixth end oriented at an angle of approximately 90 degrees to the third longitudinal axis, the sixth end adapted to interconnect to a cable terminator.

In one embodiment, a cable terminator comprises a copper cable terminator and the cable connector comprises a copper cable connector. In another embodiment, the cable terminator comprises a fiber optic cable terminator and the cable connector comprises a fiber optic cable connector. In some embodiments of the rotatable cable assembly backshell of the present invention, the first hollow interior of the connector piece, first rotatable joint, the second hollow interior of the union piece, the second rotatable joint, and the third hollow interior of the cable entry piece have smooth interior surfaces with no sharp edges. In another embodiment, the cable connector and the connector piece are combined to form a combined connector piece. In another embodiment, the cable terminator and the cable entry piece are combined to form a combined cable entry piece.

It is another aspect of embodiments of the present invention to provide a locking mechanism to prevent inadvertent rotation or movement of the connector piece and the cable entry piece relative to the union piece. In one embodiment, the locking mechanism comprises a first pair of diametrically opposed grooves formed in the first cylindrical body of the connector piece adjacent to the second end and a second pair of diametrically opposed grooves formed in the third cylindrical body of the cable entry piece adjacent to the fifth end. The locking mechanism further comprises a hole (which could comprise a cavity) in the second cylindrical body of the union piece, a retaining ring substantially centered on the hole in the second cylindrical body, the retaining ring having an interior diameter. A fastener with a cylindrical shaft and a protrusion on the cylindrical shaft is adapted to engage a slot in the hole to releasably interconnect the fastener to the union piece in an engaged position. The protrusion has an exterior diameter greater than the interior diameter of the retaining ring and the fastener is secured to the union piece when the protrusion on the cylindrical shaft is disengaged from the slot in the hole. A locking knob is interconnected to the cylindrical shaft of the fastener. The connector piece and the cable entry piece can rotate freely relative to the union piece when the locking mechanism is in an unlocked position wherein the protrusion of the fastener is disengaged from the slot in the hole. When the locking mechanism is in a locked position, the protrusion of the fastener is engaged in the slot in the hole and the locking knob fits into one of the first pair of diametrically opposed grooves and one of the second pair of diametrically opposed grooves thus preventing the first rotatable joint and the second rotatable joint from rotating.

In another aspect of the present invention, a method of forming a rotatable cable assembly backshell is provided, the method generally comprising (1) forming a connector piece having a first cylindrical body extending along a first longitudinal axis, the first cylindrical body having a first hollow interior and a first end oriented at an angle of approximately 90 degrees to the first longitudinal axis, the first end adapted to interconnect with a cable connector or connector head, the first cylindrical body having a second end oriented at an angle of approximately 67.5 degrees to the first longitudinal axis; (2) forming a union piece having a second cylindrical body extending along a second longitudinal axis, the second cylindrical body having a second hollow interior and a third end oriented at an angle of approximately 67.5 degrees to the second longitudinal axis, the second cylindrical body having a fourth end oriented at an angle of approximately 112.5 degrees to the second longitudinal axis; (3) forming a cable entry piece having a third cylindrical body extending along a third longitudinal axis, the third cylindrical body having a third hollow interior and a fifth end oriented at an angle of approximately 112.5 degrees to the third longitudinal axis, the third cylindrical body having a sixth end oriented at an angle of approximately 90 degrees to the third longitudinal axis, the sixth end adapted to interconnect to a cable terminator; (4) interconnecting the second end of the connector piece to the third end of the union piece forming a first rotatable joint; and (5) interconnecting the fourth end of the union piece to the fifth end of the cable entry piece forming a second rotatable joint. While a general order of the method is described, it shall be understood that the method can include more or fewer elements or the order of the elements may be arranged differently than described above without departing from the scope of the present invention. Optionally, the method may further comprise (6) interconnecting the first end of the connector piece to a cable connector; (7) interconnecting the sixth end of the cable entry piece to a cable terminator; and (8) forming a locking mechanism interconnected to the union piece, the locking mechanism operable to prevent inadvertent rotation of the connector piece and the cable entry piece relative to the union piece by engaging grooves formed in the first cylindrical body of the connector piece and the third cylindrical body of the cable entry piece. Optionally, a connector head or cable connector may be formed in the first end of the connector piece to form a combined connector piece and a cable terminator may be formed in the six end of the cable entry piece to form a combined cable entry piece.

It is yet another aspect of the present invention to provide a method of interconnecting a cable to an electrical component, the method generally comprising (1) providing a rotatable cable assembly backshell, the rotatable cable assembly backshell comprising: a connector piece having a first end and a second end; a union piece having a third end and a fourth end, the third end interconnected to the second end of the connector piece at a first rotatable joint; a cable entry piece having a fifth end and a sixth end, the fifth end interconnected to the fourth end of the union piece at a second rotatable joint; and a locking mechanism operable to prevent inadvertent rotation of the connector piece and the cable entry piece relative to the union piece; (2) interconnecting an end of the cable to a selected cable terminator; (3) interconnecting the selected cable terminator to the sixth end of the cable entry piece; (4) interconnecting a selected cable connector to the first end of the connector piece; (5) positioning the rotatable cable assembly backshell adjacent to a receptacle of the electrical component; (6) inserting the selected cable connector into the receptacle of the electrical component; (7) rotating the connector piece and the cable entry piece relative to the union piece to a predetermined angle; and (8) positioning the locking mechanism in a locked position. Optionally, the method of interconnecting the cable to the electrical component may further include (9) selecting a copper cable terminator or a fiber optic cable terminator to interconnect to the sixth; and (10) selecting a copper cable connector or a fiber optic cable connector to interconnect to the first end.

It is another aspect of the present invention to provide a cable assembly backshell environmentally sealed to function in hot, cold, dusty, wet, marine, and salty climates without degradation of operational characteristics or damage to electrical components. The cable assembly backshell of one embodiment has metallic plating on all exterior surfaces and all joints are sealed with o-rings. Alternatively, the exterior surfaces may be coated with a durable sealant to protect the surfaces from adverse environmental conditions. The plating or coatings prevent damage or degradation of the surfaces of the backshell. Further, the plating and/or coatings, and the seals prevent foreign objects and contaminates from entering the interior of the backshell. The contemplated cable assembly backshell provides radio frequency interference protection with 360° electrical bonding at both rotating joints and the connector piece and the cable entry piece.

It is another aspect of embodiments of the present invention to provide a rotatable cable assembly backshell, comprising: a connector piece having a first cylindrical body extending along a first longitudinal axis, the first cylindrical body having a first hollow interior and a first end oriented at an angle of approximately 90 degrees to the first longitudinal axis, the first end adapted to interconnect with a cable connector, the first cylindrical body having a second end oriented at an angle of approximately 67.5 degrees to the first longitudinal axis; a union piece having a second cylindrical body extending along a second longitudinal axis, the second cylindrical body having a second hollow interior and a third end oriented at an angle of approximately 67.5 degrees to the second longitudinal axis, the third end interconnected to the second end of the connector piece at a first rotatable joint, the second cylindrical body having a fourth end oriented at an angle of approximately 112.5 degrees to the second longitudinal axis; and a cable entry piece having a third cylindrical body extending along a third longitudinal axis, the third cylindrical body having a third hollow interior and a fifth end oriented at an angle of approximately 112.5 degrees to the third longitudinal axis, the fifth end interconnected to the fourth end of the union piece at a second rotatable joint, the third cylindrical body having a sixth end oriented at an angle of approximately 90 degrees to the third longitudinal axis, the sixth end adapted to interconnect to a cable terminator.

It is yet another aspect of embodiments of the present invention to provide a method of forming a rotatable cable assembly backshell, comprising: forming a connector piece having a first cylindrical body extending along a first longitudinal axis, the first cylindrical body having a first hollow interior and a first end oriented at an angle of approximately 90 degrees to the first longitudinal axis, the first end adapted to interconnect with a cable connector, the first cylindrical body having a second end oriented at an angle of approximately 67.5 degrees to the first longitudinal axis; forming a union piece having a second cylindrical body extending along a second longitudinal axis, the second cylindrical body having a second hollow interior and a third end oriented at an angle of approximately 67.5 degrees to the second longitudinal axis, the second cylindrical body having a fourth end oriented at an angle of approximately 112.5 degrees to the second longitudinal axis; forming a cable entry piece having a third cylindrical body extending along a third longitudinal axis, the third cylindrical body having a third hollow interior and a fifth end oriented at an angle of approximately 112.5 degrees to the third longitudinal axis, the third cylindrical body having a sixth end oriented at an angle of approximately 90 degrees to the third longitudinal axis, the sixth end adapted to interconnect to a cable terminator; interconnecting the second end of the connector piece to the third end of the union piece thereby forming a first rotatable joint; and interconnecting the fourth end of the union piece to the fifth end of the cable entry piece thereby forming a second rotatable joint.

It is still yet another aspect of embodiments of the present invention to provide a method of interconnecting a cable to an electrical component, the method comprising: providing a rotatable cable assembly backshell, the rotatable cable assembly backshell comprising: a connector piece having a first end and a second end; a union piece having a third end and a fourth end, the third end interconnected to the second end of the connector piece at a first rotatable joint; a cable entry piece having a fifth end and a sixth end, the fifth end interconnected to the fourth end of the union piece at a second rotatable joint; and a locking mechanism operable to prevent inadvertent movement of the connector piece and the cable entry piece relative to the union piece; interconnecting an end of the cable to a selected cable terminator; interconnecting the selected cable terminator to the sixth end of the cable entry piece; interconnecting a selected cable connector to the first end of the connector piece; positioning the rotatable cable assembly backshell adjacent to a receptacle of the electrical component; inserting the selected cable connector into the receptacle of the electrical component; rotating the connector piece and the cable entry piece relative to the union piece to a predetermined angle; and positioning the locking mechanism in a locked position.

These and other advantages will be apparent from the disclosure of the invention(s) contained herein. The above-described embodiments, objectives, and configurations are neither complete nor exhaustive. As will be appreciated, other embodiments of the invention are possible using, alone or in combination, one or more of the features set forth above or described below. Further, the Summary of the Invention is neither intended nor should it be construed as representing the full extent and scope of the present invention. The present invention is set forth in various levels of detail in the Summary of the Invention, and, in the attached drawings and the Detailed Description of the invention and no limitation as to the scope of the present invention is intended to either the inclusion or non-inclusion of elements, components, etc. in this summary of the invention. Additional aspects of the present invention will become more readily apparent from the detailed description, particularly when taken with the drawings.

BRIEF DESCRIPTION OF THE DRAWINGS

The accompanying drawings, which are incorporated in and constitute a part of the specification, illustrate embodiments of the disclosure and with the general description of the disclosure given above and the detailed description of the drawings given below, explain the principles of the disclosures.

Figure 1:
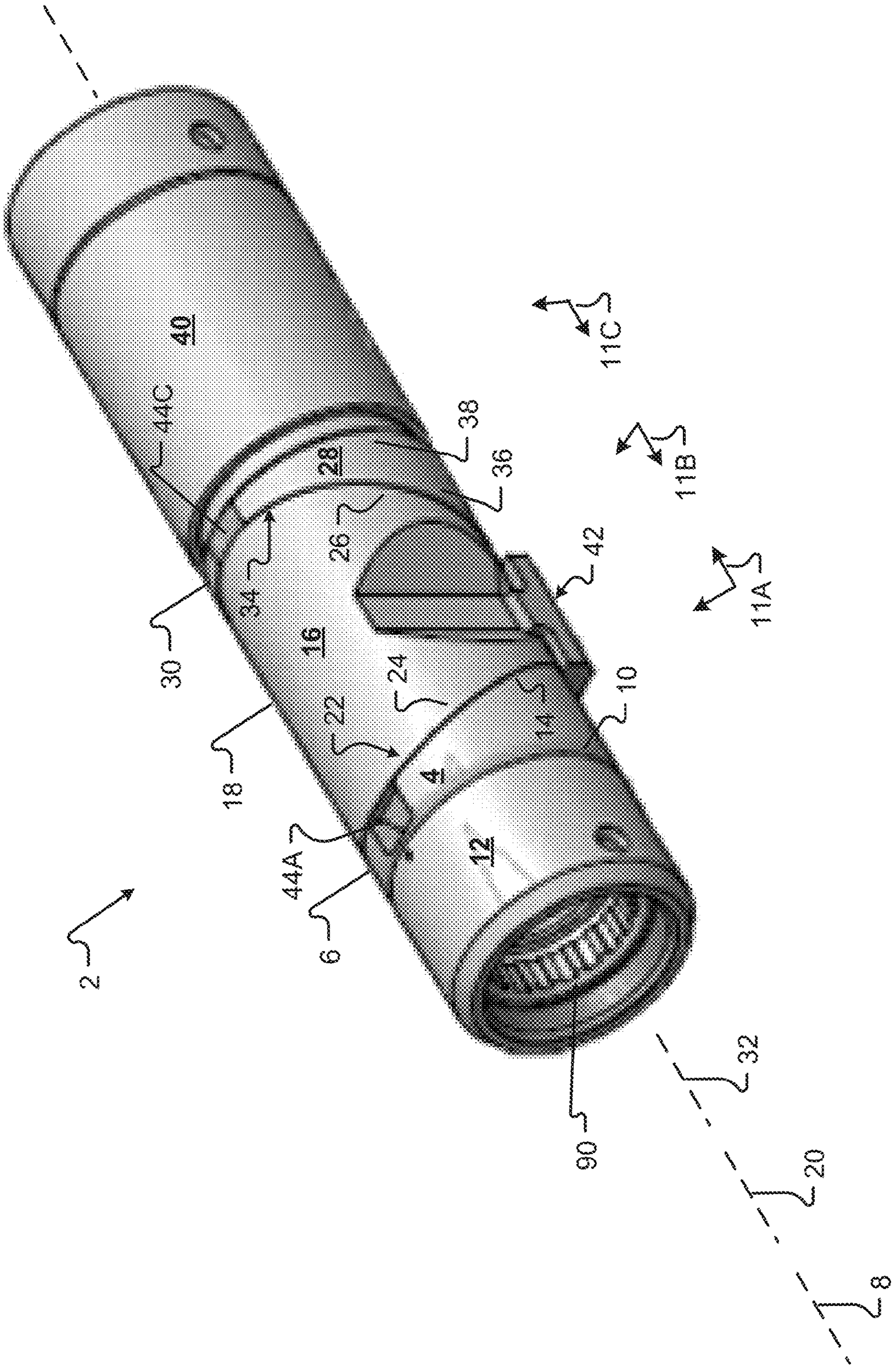
FIG. 1 is an isometric view of a cable assembly backshell according to one embodiment of the present invention in a straight configuration.

To assist in the understanding of one embodiment of the present invention, the following list of components and associated numbering found in the drawings is provided below:

| Number | Component |
|---|---|
| 2 | Cable assembly backshell |
| 4 | Connector piece |
| 6 | First cylindrical body |
| 8 | First longitudinal axis |
| 10 | First end |
| 11 | Angle |
| 12 | Cable connector |
| 14 | Second end |
| 16 | Union piece |
| 18 | Second cylindrical body |
| 20 | Second longitudinal axis |
| 22 | First rotatable joint |
| 24 | Third end |
| 26 | Fourth end |
| 28 | Cable entry piece |
| 30 | Third cylindrical body |
| 32 | Third longitudinal axis |
| 34 | Second rotatable joint |
| 36 | Fifth end |
| 38 | Sixth end |
| 39 | Threaded portion |
| 40 | Cable terminator |
| 42 | Locking mechanism |
| 44 | Grooves |
| 46 | Cylindrical housing |
| 48 | First spacer |
| 50 | Second spacer |
| 52 | Threaded connector |
| 54 | Terminator end piece |
| 56 | O-rings |
| 58 | First flexible ring |
| 60 | Barrel spacer |
| 62 | Flanges |
| 63 | Clamp |
| 64 | Second flexible ring |
| 65 | Screw |
| 66 | End piece |
| 67 | Fastener |
| 68 | Shaft |
| 69 | Head |
| 70 | Hole |
| 71 | Lip |
| 72 | Retaining ring |
| 73 | Protrusion |
| 74 | Locking knob |
| 76 | Extensions |
| 78 | Connector extension |
| 80 | Cable entry extension |
| 82 | Semicircular track |
| 83 | Ball bearing |
| 84 | Semi-circular grooves |
| 86 | Wire entry hole |
| 90 | Cable adapter |
| 102 | Cable assembly backshell |
| 104 | Connector piece |
| 106 | First cylindrical body |
| 108 | First longitudinal axis |
| 110 | First end |

-continued

| Number | Component |
|---|---|
| 112 | Cable connector |
| 114 | Second end |
| 116 | Union piece |
| 118 | Second cylindrical body |
| 120 | Second longitudinal axis |
| 122 | First rotatable joint |
| 124 | Third end |
| 126 | Fourth end |
| 128 | Cable entry piece |
| 130 | Third cylindrical body |
| 132 | Third longitudinal axis |
| 134 | Second rotatable joint |
| 136 | Fifth end |
| 138 | Sixth end |
| 139 | Threaded portion |
| 140 | Cable terminator |
| 142 | Locking mechanism |
| 144 | Grooves |
| 146 | First ring |
| 147 | Second ring |
| 148 | Threaded connector |
| 150 | Third ring |
| 152 | Fourth ring |
| 154 | Terminator end piece |
| 156 | Clamp |
| 157 | Screw |
| 158 | Flanged spacer |
| 160 | Flexible ring |
| 162 | First ring |
| 164 | Second ring |
| 166 | End piece |
| 167 | Fastener |
| 168 | Shaft |
| 169 | Head |
| 170 | Threaded hole |
| 172 | Retaining ring |
| 173 | Protrusion |
| 174 | Locking knob |
| 176 | Extensions |
| 178 | Connector piece extension |
| 180 | Cable entry piece extension |
| 182 | Grooves |
| 184 | Ball bearing |
| 186 | Semi-circular grooves |
| 188 | Semi-circular grooves |
| 190 | Cable adapter |
| 202 | Cable assembly backshell |
| 204 | Connector piece |
| 206 | First cylindrical body |
| 208 | First longitudinal axis |
| 210 | First end |
| 212 | Cable connector |
| 214 | Second end |
| 216 | Union piece |
| 218 | Second cylindrical body |
| 220 | Second longitudinal axis |
| 222 | First rotatable joint |
| 224 | Third end |
| 226 | Fourth end |
| 228 | Cable entry piece |
| 230 | Third cylindrical body |
| 232 | Third longitudinal axis |
| 234 | Second rotatable joint |
| 236 | Fifth end |
| 238 | Sixth end |
| 239 | Threaded portion |
| 240 | Cable terminator |
| 242 | Locking mechanism |
| 244 | Grooves |
| 246 | Collar |
| 248 | Closure |
| 250 | First cylinder |
| 252 | First spacer |
| 254 | Second spacer |
| 256 | Ring |
| 258 | Flexible ring |
| 260 | Terminator end piece |

-continued

| Number | Component |
|---|---|
| 262 | Clamps |
| 264 | Screw |
| 276 | Extensions |
| 290 | Cable adapter |
| 292 | Body |
| 294 | Threads |

It should be understood that the drawings are not necessarily to scale. In certain instances, details that are not necessary for an understanding of the disclosure or that render other details difficult to perceive may have been omitted. It should also be understood that the disclosure is not limited to the embodiments illustrated herein.

DETAILED DESCRIPTION

Referring now to FIG. 1, a rotatable cable assembly backshell 2 of one embodiment of the present invention is illustrated in a straight configuration. The backshell 2 has a connector piece 4 with a first cylindrical body 6 generally extending along a first longitudinal axis 8. The first cylindrical body 6 has a first hollow interior and a first end 10 oriented at an angle 11A of approximately 90° to the first longitudinal axis 8. The first end 10 is interconnected to a connector head or cable connector 12, which in FIG. 1 is adapted to interconnect to a fiber optic cable. Alternatively, a cable connector 12 adapted to interconnect to a copper cable may be interconnected to the cable assembly backshell 2. A cable adapter 90 of one embodiment of the present invention is interconnected to the cable connector 12. Cable adapters 90 of different configurations adapted to function with cables of different sizes and/or different types (such as fiber optic cables or copper cables) may be interconnected to the cable connector 12 of the present invention. Cable adapters are described in more detail in conjunction with FIG. 19. One of skill in the art will appreciate that the cable connector 12 can be incorporated into the connector piece 4 without departing from the scope of the present invention. The first cylindrical body 6 has a second end 14 oriented at an angle 11B of approximately 67.5° to the first longitudinal axis 8.

A union piece 16 comprising a second cylindrical body 18 generally extending along a second longitudinal axis 20, which in this configuration corresponds with the first longitudinal axis 8, is interconnected to the connector piece 4 at a first rotatable joint 22. The second cylindrical body 18 has a second hollow interior and a third end 24 oriented at an angle 11B of approximately 67.5° to the second longitudinal axis 20. The third end 24 is interconnected to the second end 14 of the connector piece 4 at the first rotatable joint 22. The second cylindrical body 18 has a fourth end 26 oriented at an angle 11C of approximately 112.5° to the second longitudinal axis 20.

A cable entry piece 28 having a third cylindrical body 30 generally extending along a third longitudinal axis 32, which in this configuration corresponds with the first longitudinal axis 8 and the second longitudinal axis 20, is interconnected to the union piece 16 at a second rotatable joint 34. The third cylindrical body 30 has a third hollow interior and a fifth end 36 oriented at an angle 11C of approximately 112.5° to the third longitudinal axis 32. The fifth end 36 is interconnected to the fourth end 26 of the union piece 16 at the second rotatable joint 34. The third cylindrical body 30 has a sixth end 38 oriented at an angle 11A of approximately 90° to the third longitudinal axis 32. The sixth end 38 is interconnected to a cable terminator 40. The cable assembly backshell 2 illustrated in FIG. 1 is illustrated interconnected to a fiber optic cable connector 12 and a fiber optic cable terminator 40; however, a cable connector and a cable terminator adapted for a copper cable may optionally be interconnected to the backshell 2. As appreciated by one of skill in the art, the cable terminator 40 and the cable entry piece 28 can be combined into one cable entry piece 28 without departing from the scope of the present invention.

The cable assembly backshell 2 has a locking mechanism 42 to prevent inadvertent or unintended rotation of the connector piece 4 and the cable entry piece 28 relative to the union piece 16. The locking mechanism 42 is described in more detail in conjunction with FIGS. 7A and 7B. Two diametrically opposed grooves 44A and 44B (illustrated in FIG. 3) are formed in the first cylindrical body 6 of the connector piece 4. Two more diametrically opposed grooves 44C and 44D (illustrated in FIG. 7A) are formed in the third cylindrical body 30 of the cable entry piece 28. Two extensions 76 of the locking mechanism 42 fit into the grooves 44 when the locking mechanism 42 is positioned in a locked configuration to prevent movement of the connector piece 4 and the cable entry piece 28. Optionally, in some embodiments of the present invention, more grooves 44 may be formed in the first cylindrical body 6 and the third cylindrical body 30 to enable the locking mechanism 42 to lock the connector piece 4 and the cable entry piece 28 in additional angular configurations. For example, in one embodiment, grooves 44 are formed approximately every 10° around the circumference of the first cylindrical body 6 of the connector piece 4 proximate to the second end and around the circumference of the third cylindrical body 30 of the cable entry piece 28 proximate the fifth end 36.

The exterior surfaces of the cable assembly backshell 2 are coated to protect the surfaces from damage caused by exposure to adverse environmental conditions. The coatings may comprise metallic plating on exterior surfaces of the bodies 6, 18, 30 of the connector piece 4, union piece 16, and the cable entry piece 28, respectively. Alternatively, the exterior surfaces may be coated with a sealant. Further, seals are provided between all joints of the backshell. The seals may comprise o-rings (illustrated in FIGS. 5, 6, and 7A) to seal the first and second rotatable joints 22, 34, the interconnections between the connector piece 4 and the cable connector 12 and between the cable entry piece 28 and the cable terminator 40. The plating and the seals provide a barrier that protects the cable assembly backshell 2 from moisture, salt spray, and infiltration by dust or other foreign objects and contaminants.

The cable assembly backshell 2 also has electrical bonding between the cable connector 12, the connector piece 4, the union piece 16, the cable entry piece 28, and the cable terminator 40. The electrical bonding protects the backshell 2 and components it is interconnected to from radio frequency interference and provides electrical grounding across all components of the backshell 102.

Figure 2:
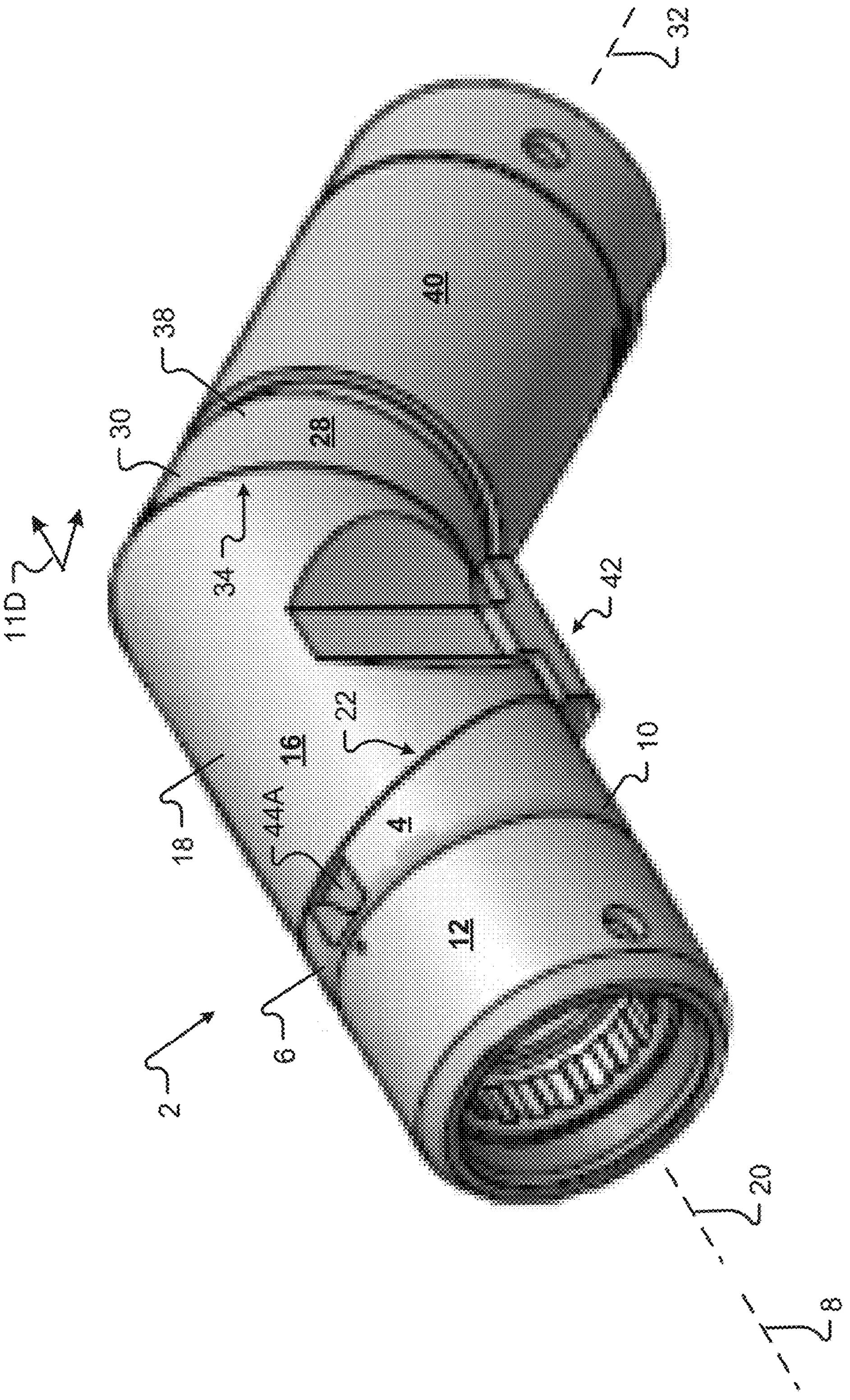
FIG. 2 is an isometric view of the cable assembly backshell of FIG. 1 in a first 45° configuration.

Turning now to FIG. 2, the cable assembly backshell 2 of FIG. 1 is illustrated in a first 45° configuration. The connector piece 4 and the union piece 16 are in the same angular relationship as illustrated in FIG. 1 where the first longitudinal axis 8 and the second longitudinal axis 20 are coincident. Here the cable entry piece 28 has been rotated 180° about the first longitudinal axis 8, which positions the third longitudinal axis 32 approximately 45° clockwise relative to the first longitudinal axis 8. Thus, the first end 10 is oriented at an angle 11D of approximately 45° to the sixth end 38.

Figure 3:
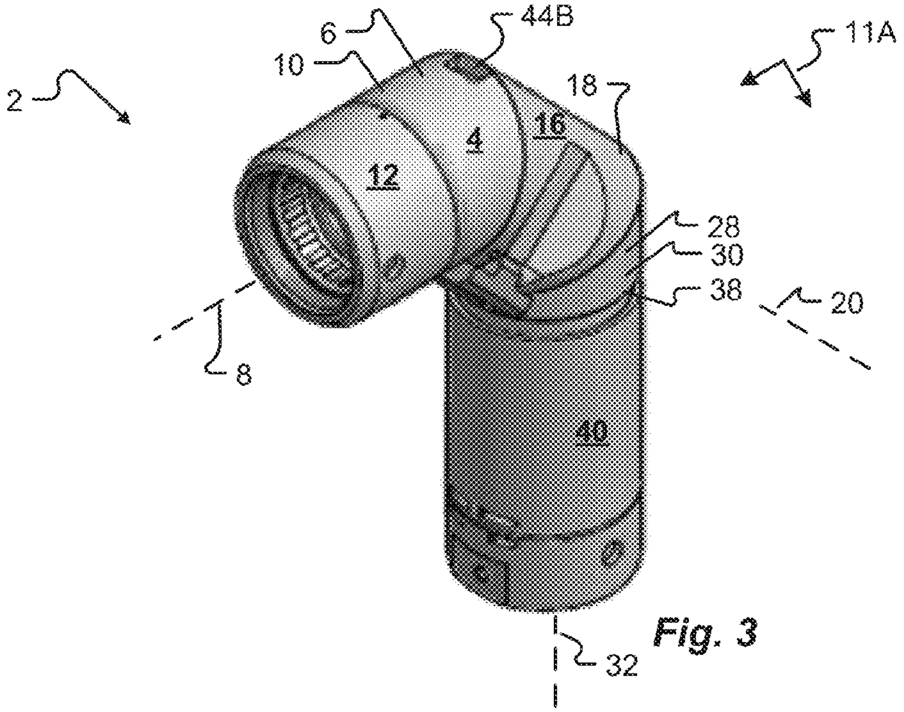
FIG. 3 is an isometric view of the cable assembly backshell of FIG. 1 in a 90° configuration.

FIG. 3 illustrates the cable assembly backshell 2 in a 90° configuration. The union piece 16 and the cable entry piece 28 are in the same orientation to each other as illustrated in FIG. 2 when the third longitudinal axis 32 is angled approximately 45° from the second longitudinal axis 20. The connector piece 4 has been rotated 180° about the second longitudinal axis 20, which positions the first longitudinal axis 8 approximately 45° clockwise relative to the second longitudinal axis 20. Thus, the first end 10 is oriented at an angle 11A of approximately 90° to the sixth end 38.

Figure 4:
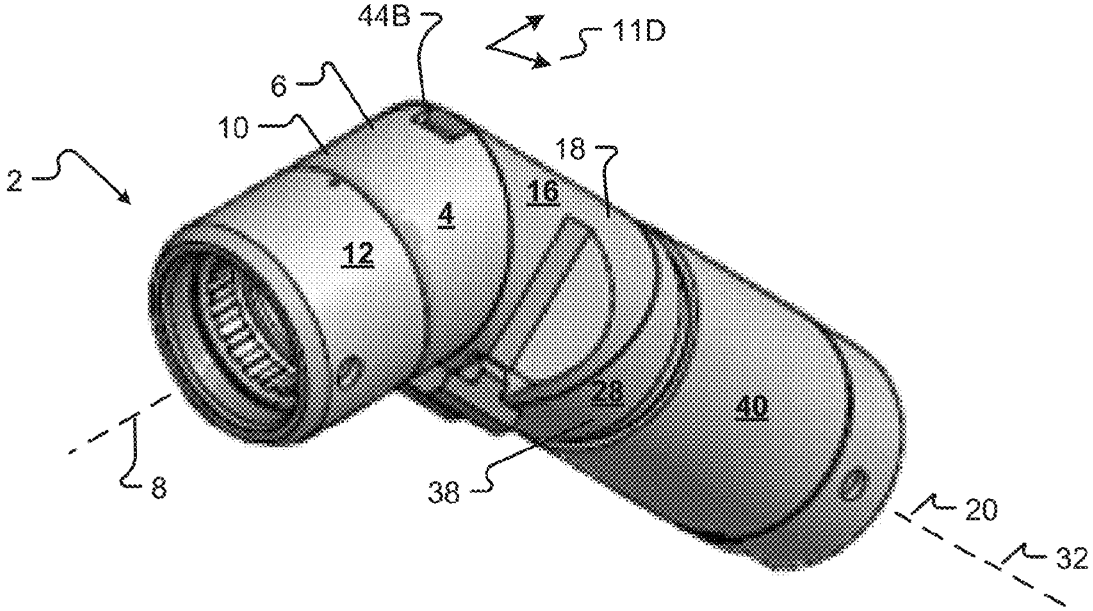
FIG. 4 is an isometric view of the cable assembly backshell of FIG. 1 in a second 45° configuration.

A second 45° configuration of the cable assembly backshell 2 is illustrated in FIG. 4. The connector piece 4 is in the same orientation regarding the union piece 16 as illustrated in FIG. 3. The cable entry piece 28 has been rotated 180° back to the position of the cable entry piece 28 illustrated in FIG. 1, orienting the first end 10 at an angle 11D of approximately 45° to the sixth end 38.

Figure 5:
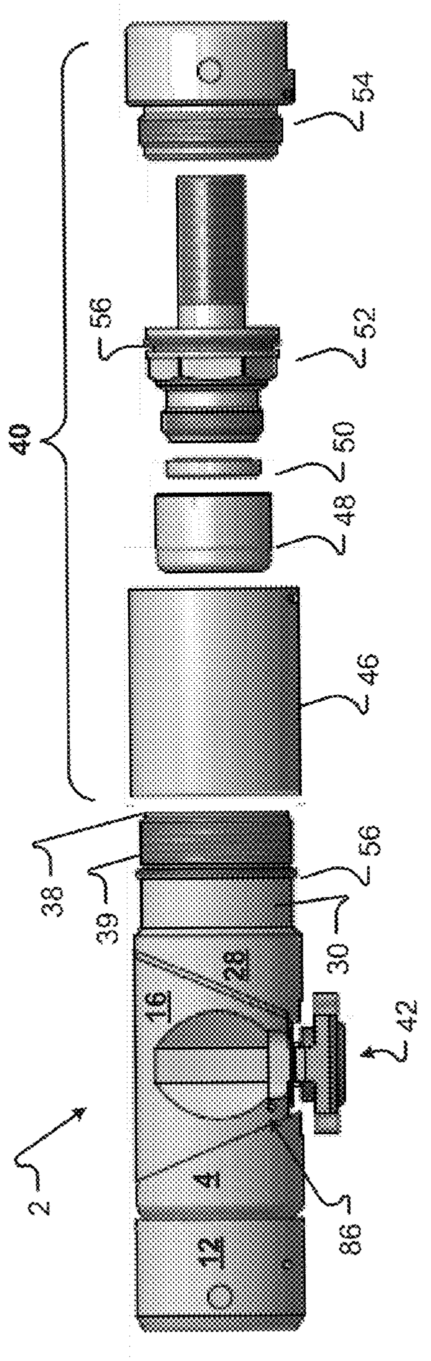
FIG. 5 is an exploded view of the cable assembly backshell of FIG. 1 with a fiber optic cable terminator.

Referring now to FIG. 5, an exploded view of the cable assembly backshell 2 of the present invention is illustrated with a fiber optic cable terminator 40. The cable terminator 40 has a hollow cylindrical housing 46 with threads formed on an interior surface at each end of the housing 46, a first spacer 48 with internal threads, a second spacer 50, a threaded connector 52, and a threaded terminator end piece 54. O-rings 56 are positioned between all connections to form a seal to prevent contaminates from entering into the interior of the backshell 2. FIG. 5 also illustrates a threaded portion 39 formed on an exterior surface portion of the third cylindrical body 30 proximate the sixth end 38. A hole 86 is illustrated in the union piece 16 for installation of a wire used to interconnect the connector piece 4, union piece 16, and the cable entry piece 28.

Figure 6:
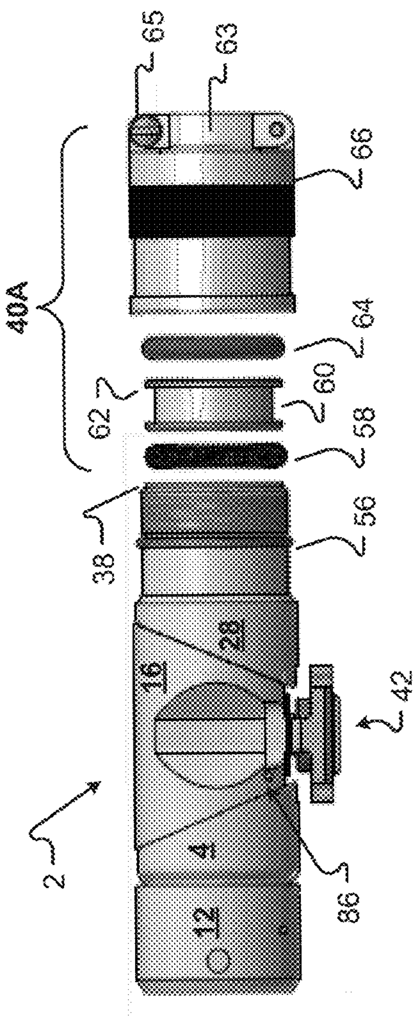
FIG. 6 is an exploded view of the cable assembly backshell of FIG. 1 with one embodiment of a cable terminator.

An exploded view of the cable assembly backshell 2 with another embodiment of a cable terminator 40A is illustrated in FIG. 6. The cable terminator 40A has a first flexible ring 58, a barrel spacer 60 with flanges 62 at each end, a second flexible ring 64, and an end piece 66 with internal threads an end proximate to the sixth end 38 of the cable entry piece 28. The end piece 66 includes a clamp 63 that can be adjusted with a screw 65.

Figure 7A:
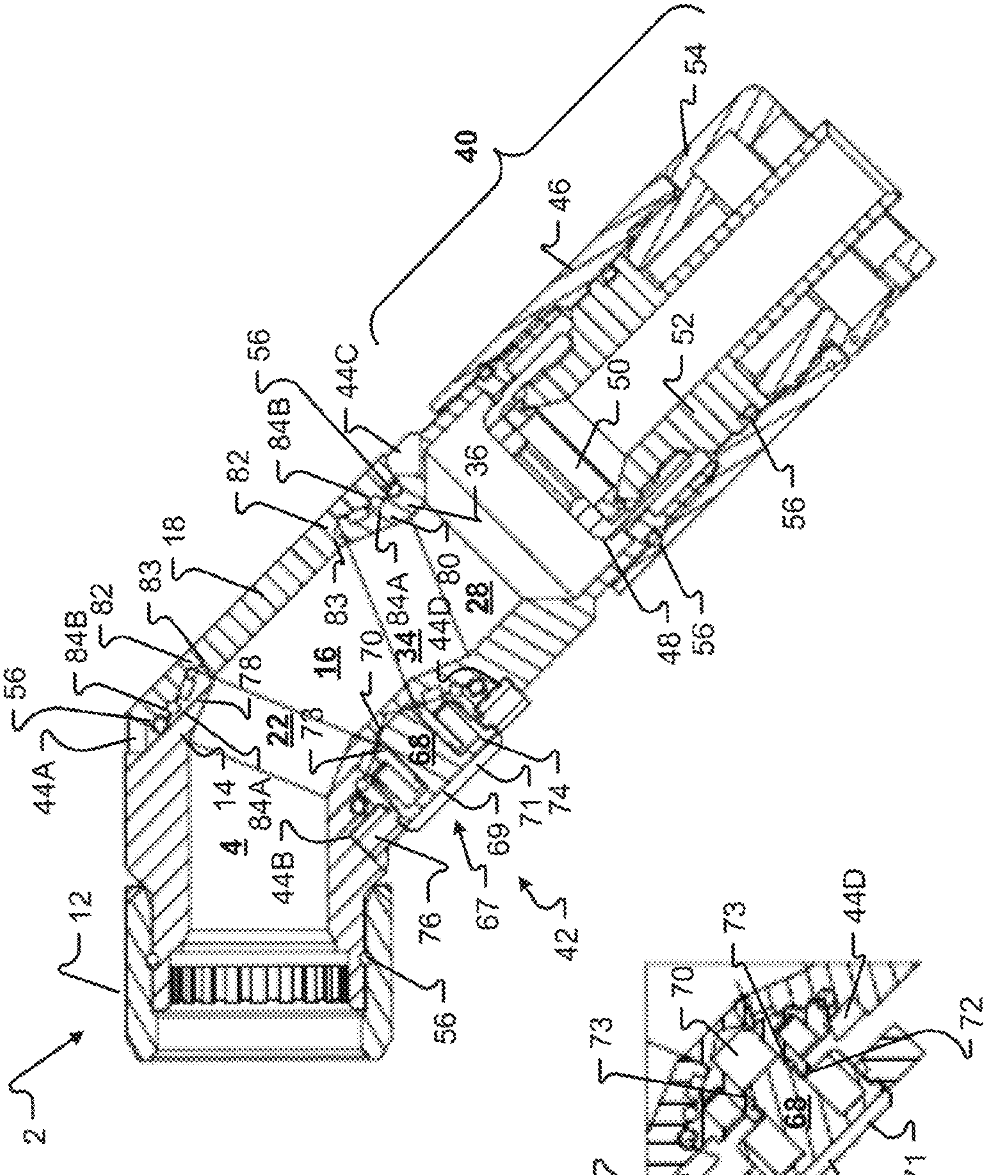
FIGS. 7A and 7B are section views of the cable assembly backshell of FIG. 4 with a fiber optic terminator.
Figure 7B:
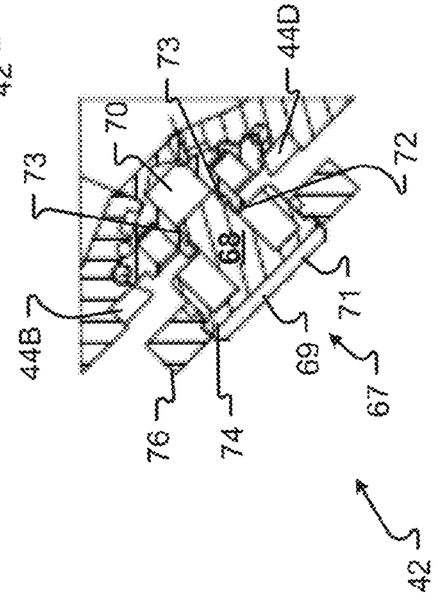

FIG. 7A illustrates a section view of the cable assembly backshell 2 with a fiber optic cable terminator 40. The locking mechanism 42 is illustrated in a locked position wherein a fastener 67 is engaged in a hole 70 in the second cylindrical body 18 of the union piece 16. FIG. 7B is a detail view of the locking mechanism 42 in an unlocked position. The fastener 67 has a cylindrical shaft 68 adapted to be inserted into and retained in the hole 70. A ring or protrusion 73 is positioned on the cylindrical shaft 68 of the fastener 67. In one embodiment, the protrusion 73 fits into a slot formed in the hole 70 when the locking mechanism 42 is in the locked position to interconnect the fastener 67 to the second cylindrical body 18 of the union piece 16. In another embodiment, threads are formed on the cylindrical shaft 68 of the fastener 67 to engage threads formed in the hole 70 to interconnect the fastener 67 to the cylindrical body 18 when the locking mechanism is in the locked position.

A head 69 with a lip 71 is formed at an outer end of the cylindrical shaft 68 of the fastener 67. A retaining ring 72 is formed on the second cylindrical body 18 of the union piece 16, the retaining ring 72 centered on the hole 70. The protrusion 73 on the cylindrical shaft 68 of the fastener 67 has a larger diameter than the retaining ring 72 and the fastener 67 is secured to the second cylindrical body 18 of the union piece 16. The locking mechanism 42 includes a locking knob 74 interconnected to the union piece 16 by the head 69 of the fastener 67. The locking knob 74 has two wings or extensions 76 adapted to fit into the grooves 44 of the connector piece 4 and the cable entry piece 28 when the locking mechanism 42 is in the locked position as illustrated in FIG. 7A.

When the fastener is disengaged from the hole 70, as illustrated in FIG. 7B, the locking mechanism 42 is in the unlocked position and the locking knob 74, first rotatable joint 22, and the second rotatable joint 34 can rotate freely. Pushing the fastener 67 into the hole 70 causes the extensions 76 of the locking knob 74 to fit into the grooves 44 of the cable entry piece 28 and the connector piece which prevents the locking knob 74, first rotatable joint 22, and second rotatable joint 34 from rotating. Thus, the connector piece 4 and cable entry piece 28 are retained in a fixed position relative to the union piece 16.

FIG. 7A also illustrates additional elements of one embodiment of the cable assembly backshell 2 of the present invention. The connector piece 4 has an extension 78 formed at the second end 14 and the cable entry piece 28 has an extension 80 at the fifth end 36. Semicircular tracks 82 are formed in the full circumference of the ends of the extensions 78, 80. The tracks 82 fit a ball bearing 83. Matching grooves are formed in the union piece 16 that correspond to the position of the ball bearings 83. The grooves have a length sufficient to allow the connector piece 4 and the cable entry piece 28 to rotate up to about 180° back and forth along the same path. The extensions 78, 80 of the connector piece 4 and the cable entry piece 28 are retained in the union piece 16 by wires positioned in semi-circular grooves 84A formed in the extensions 78, 80 and matching semi-circular grooves 84B formed in the union piece 28. The wires are installed through a hole 86 (illustrated in FIGS. 5, 6) formed in the second cylindrical body 18 of the union piece 16. The wires may be formed of stainless steel or any other material known in the art. O-rings 56 are positioned between the extensions 78, 80 and an interior surface of the second cylindrical body 18. A plurality of conductors (not illustrated) are positioned adjacent to each of the o-rings 56 to provide conductivity between the each of the parts of the cable assembly backshell 2. The plurality of conductors are adapted to provide electrical bonding between the cable connector 12, the connector piece 4, the union piece 16, the cable entry piece 28, and the cable terminator 40. The plurality of conductors may be formed of any material and in any shape or size selected to provide electrical conductivity. In one embodiment the plurality of conductors are sliding springs. FIG. 7A also illustrates the smooth interior surfaces of the backshell 2. The first hollow interior, first rotatable joint 22, second hollow interior, second rotatable joint 34, and the third hollow interior all have smooth interior surfaces with no sharp edges.

Figure 8:
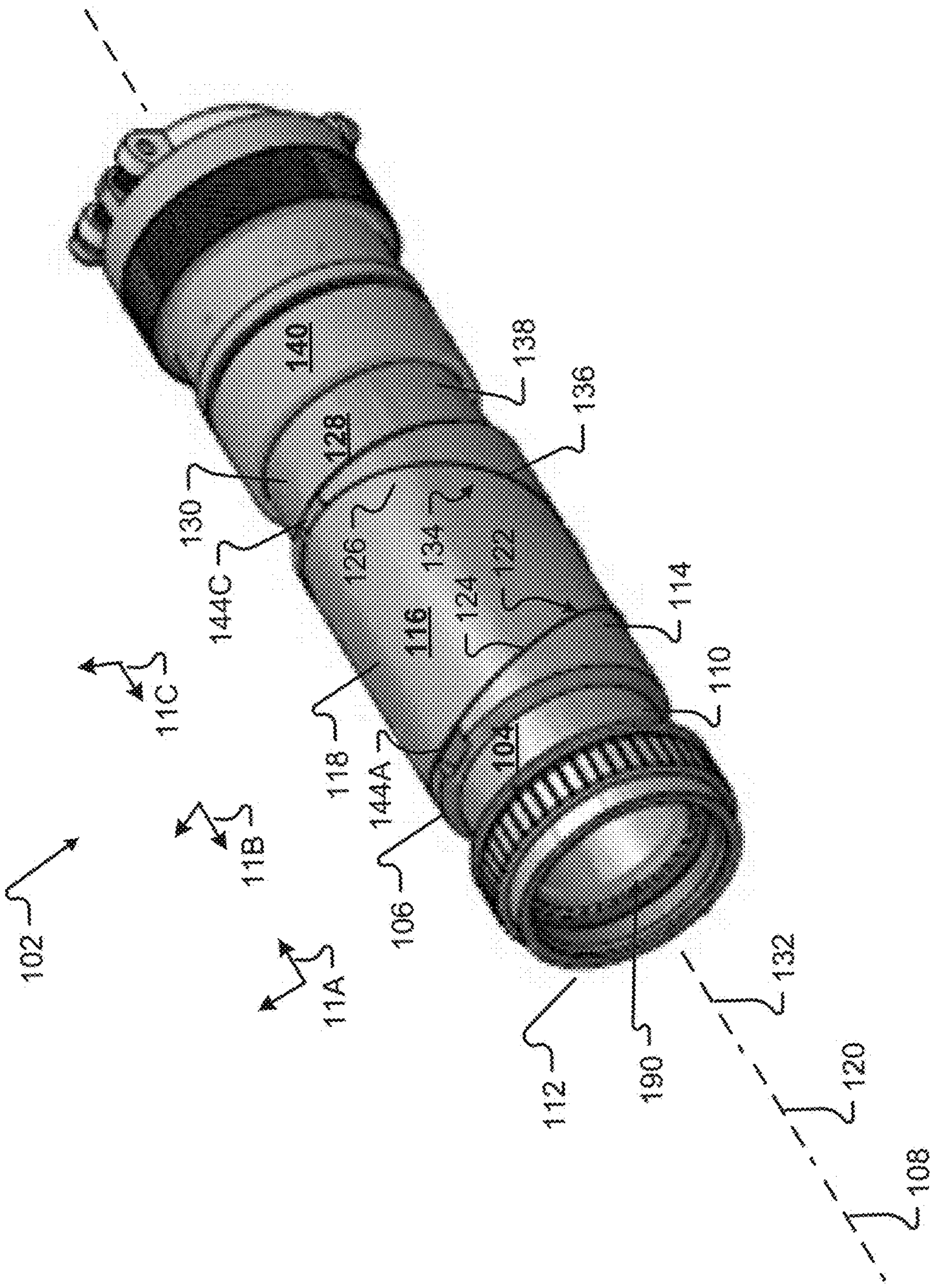
FIG. 8 is an isometric view of a cable assembly backshell according to another embodiment of the present invention in a straight configuration.

Another embodiment of a rotatable cable assembly backshell 102 of the present invention is illustrated in FIGS. 8-14. Similar to the embodiment discussed above, the backshell 102 has a connector piece 104, a first cylindrical body 106 generally extending along a first longitudinal axis 108, and a first hollow interior. A first end 110 is interconnected to a cable connector 112, which in FIG. 8 is adapted to interconnect to a fiber optic cable. A cable adapter 190 of another embodiment of the present invention is interconnected to the cable connector 112. One of skill in the art will appreciate that the cable connector 112 can be incorporated into the connector piece 104 without departing from the scope of the present invention. The first end 110 is oriented at an angle 11A of approximately 90° to the first longitudinal axis 108. A second end 114 of the connector piece 104 is oriented at an angle 11B of approximately 67.5° to the first longitudinal axis 108.

The backshell 102 has a union piece 116 comprising a second cylindrical body 118 with a second hollow interior generally extending along a second longitudinal axis 120, which in the configuration illustrated in FIG. 8 corresponds with the first longitudinal axis 108. The union piece 116 has a third end 124 oriented at an angle 11B of approximately 67.5° to the second longitudinal axis 120. The third end 124 is interconnected to the second end 114 of the connector piece 104 at a first rotatable joint 122. The union piece 116 has a fourth end 126 oriented at an angle 11C of approximately 112.5° to the second longitudinal axis 120.

A cable entry piece 128 having a third cylindrical body 130 and a third hollow interior generally extending along a third longitudinal axis 132 is interconnected to the union piece 116 at a second rotatable joint 134. In this configuration, the third longitudinal axis 132 corresponds with the first longitudinal axis 108 and the second longitudinal axis 120. The third cylindrical body 130 has a fifth end 136 oriented at an angle 11C of approximately 112.5° to the third longitudinal axis 132. The fifth end 136 is interconnected to the fourth end 126 of the union piece 116 at the second rotatable joint 134. The third cylindrical body 130 has a sixth end 138 oriented at an angle 11A of approximately 90° to the third longitudinal axis 132, the sixth end 138 is interconnected to a cable terminator 140. As appreciated by one of skill in the art, the cable terminator 140 and the cable entry piece 128 can be combined to form one cable entry piece 128 without departing from the scope of the present invention. Although the cable assembly backshell 102 is illustrated in FIG. 8 interconnected to a copper cable connector 112 and a copper cable terminator 140, a fiber optic cable connector and a fiber optic cable terminator may optionally be interconnected to the backshell 102.

Figure 14A:
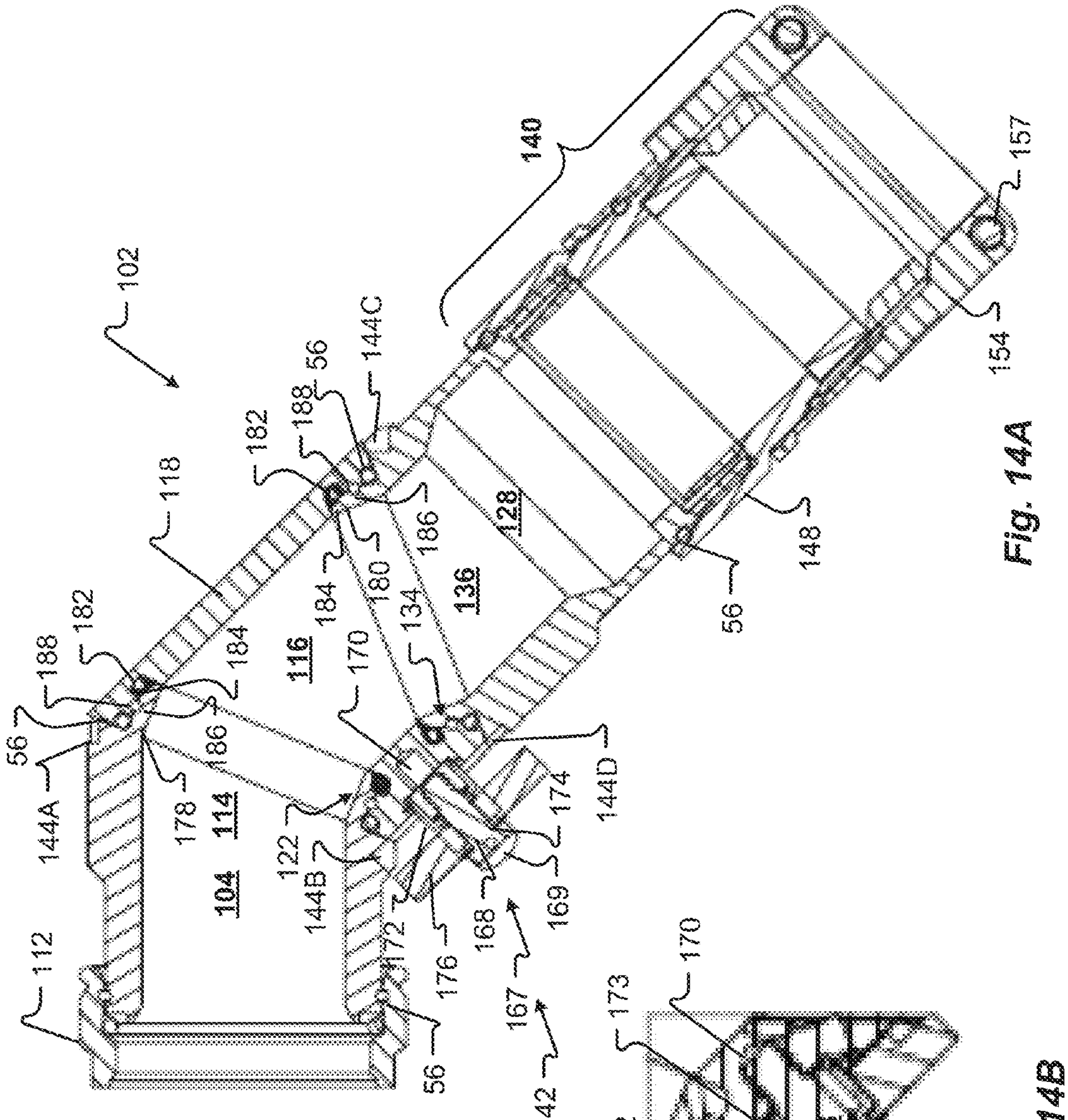
FIGS. 14A and 14B are section views of the cable assembly backshell of FIG. 8 with a fiber optic cable terminator.
Figure 14B:
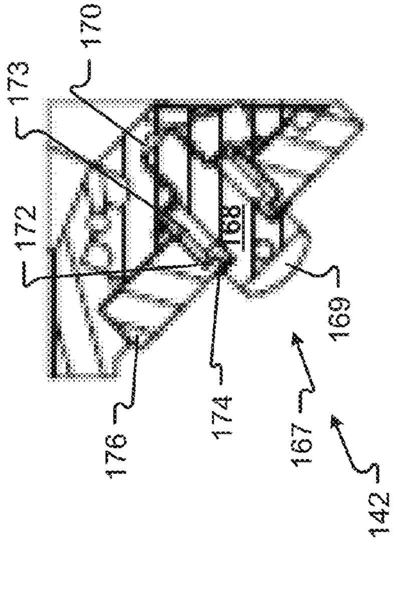

The first cylindrical body 106 of the connector piece 104 has two diametrically opposed grooves 144A and 144B (illustrated in FIG. 10) to receive extensions 176 of the locking mechanism (illustrated in FIGS. 14A, 14B). Two more diametrically opposed grooves 144C and 144D (illustrated in FIG. 14A) are formed in the third cylindrical body 130 of the cable entry piece 128. Two extensions 176 of a locking mechanism 142 (described below in more detail in conjunction with FIGS. 14A and 14B) fit into the grooves 144 when the locking mechanism 142 is positioned in a locked configuration. Optionally, in all embodiments of the present invention, additional grooves 144 may be formed in the first cylindrical body 106 and the third cylindrical body 130 to enable the locking mechanism 142 to lock the connector piece 104 and the cable entry piece 128 in additional angular configurations. In one embodiment of the present invention, grooves 144 are formed approximately every 5° around the exterior circumferences of the first cylindrical body 106 and the third cylindrical body 130 to enable the cable entry piece 128 and the connector piece 104 to be locked in a plurality of angular configurations.

Similar to the embodiment discussed above, the exterior surfaces of the cable assembly backshell 102 are coated to protect the surfaces from damage caused by exposure to adverse environmental conditions. The coatings may comprise metallic plating on exterior surfaces of the bodies 106, 118, 130 of the connector piece 104, union piece 116, and the cable entry piece 128, respectively. Alternatively, the exterior surfaces may be coated with a sealant. Further, seals are provided between all joints of the backshell 102. The seals may comprise o-rings (illustrated in FIGS. 12, 13, and 14A)

to seal the first and second rotatable joints 122, 134, the interconnections between the connector piece 104 and the cable connector 112 and between the cable entry piece 128 and the cable terminator 140. The plating and the seals provide a barrier that protects the cable assembly backshell 102 from moisture, salt spray, and infiltration by dust or other foreign objects and contaminants.

The cable assembly backshell 102 also has electrical bonding between the cable connector 112, the connector piece 104, the union piece 116, the cable entry piece 128, and the cable terminator 140. The electrical bonding protects the backshell 102 and electrical components it is interconnected to from radio frequency interference and provides electrical grounding across all components of the backshell 102.

Figure 9:
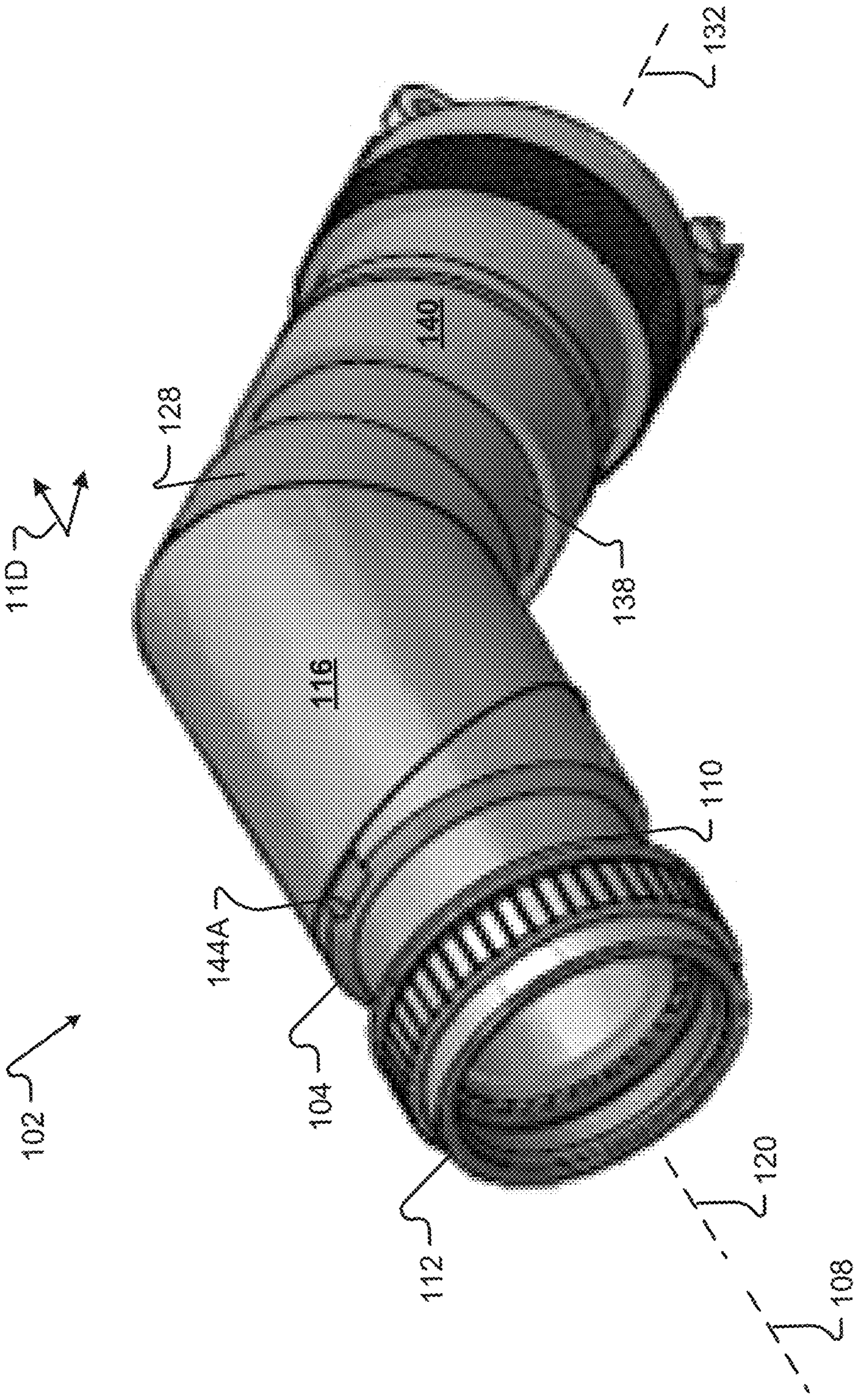
FIG. 9 is an isometric view of the cable assembly backshell of FIG. 8 in a first 45° configuration.

The joints 122, 134 allow the cable assembly backshell 102 to be aligned in four configurations. A straight configuration is illustrated in FIG. 8 where the first longitudinal axis 108, the second longitudinal axis 120, and the third longitudinal axis 132 are coincident. The cable assembly backshell 102 of the present invention is illustrated in a first 45° configuration in FIG. 9 in which the connector piece 104 and the union piece 116 are in the same angular relationship as illustrated in FIG. 8 and the first longitudinal axis 108 and the second longitudinal axis 120 are coincident. In FIG. 9, the cable entry piece 128 has been rotated approximately 180° about the first longitudinal axis 108 which positions the third longitudinal axis 132 approximately 45° clockwise relative to the first longitudinal axis 108. The first end 110 is oriented at an angle 11D of approximately 45° to the sixth end 138.

Figure 10:
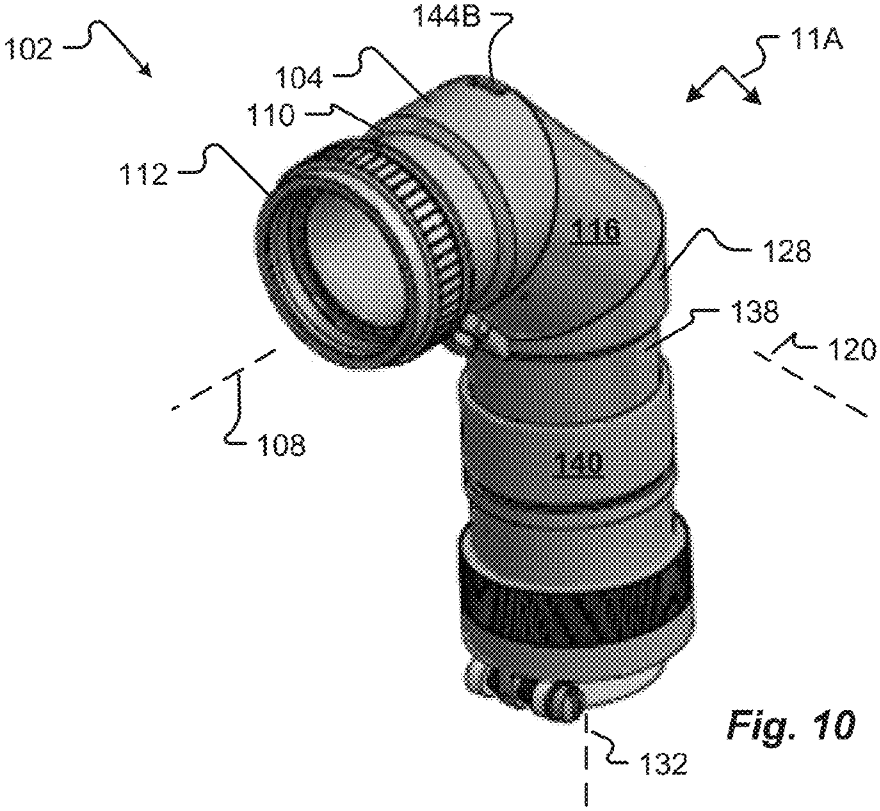
FIG. 10 is an isometric view of the cable assembly backshell of FIG. 8 in a 90° configuration.

The backshell 102 of the present invention is illustrated in a 90° configuration in FIG. 10 wherein the union piece 116 and the cable entry piece 128 are in the same orientation to each other as illustrated in FIG. 9 and the third longitudinal axis 132 is angled approximately 45° from the second longitudinal axis 120. The connector piece 104 has been rotated 180° about the second longitudinal axis 120, orienting the first end 110 at an angle 11A of approximately 90° to the sixth end 138.

Figure 11:
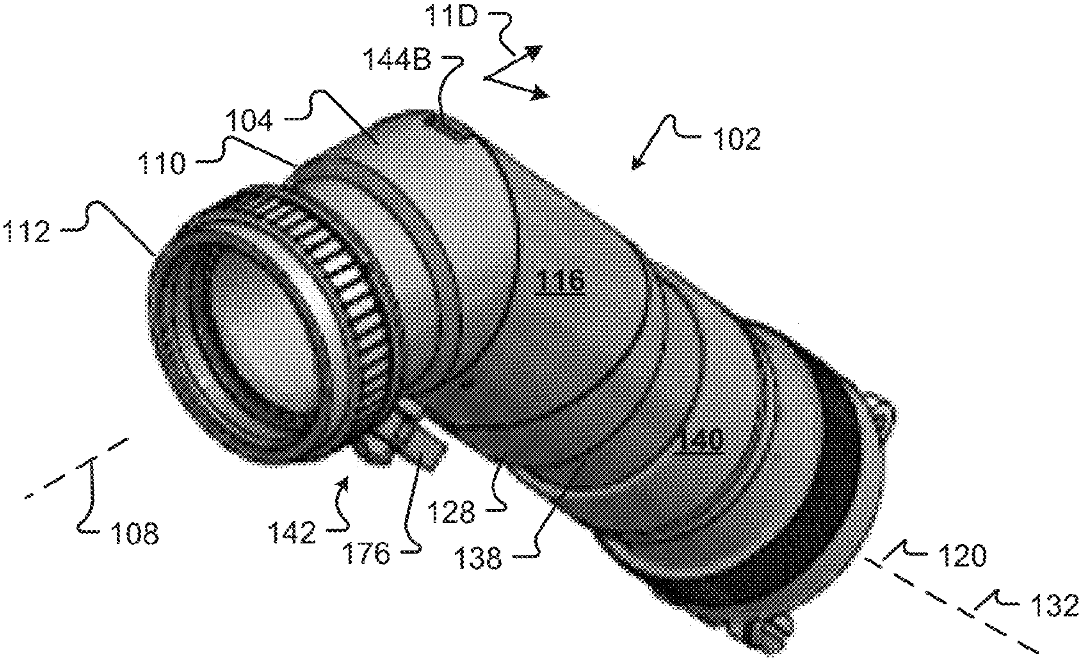
FIG. 11 is an isometric view of the cable assembly backshell of FIG. 8 in a second 45° configuration.

A second 45° configuration of the cable assembly backshell 102 in accordance with embodiments of the present invention is illustrated in FIG. 11. The connector piece 104 is in the same orientation regarding the union piece 116 as illustrated in FIG. 10. The cable entry piece 128 has been rotated 180° back to the position of the cable entry piece 128 illustrated in FIG. 8, orienting the first end 110 at an angle 11D of approximately 45° to the sixth end 138. FIG. 11 also illustrates the locking mechanism 142 in an unlocked position in which the extensions 176 are not positioned in the grooves 144A, 144B of the first cylindrical body 106 of the connector piece 104 or the grooves 144C, 114D of the third cylindrical body 130 of the cable entry piece 128.

Figure 12:
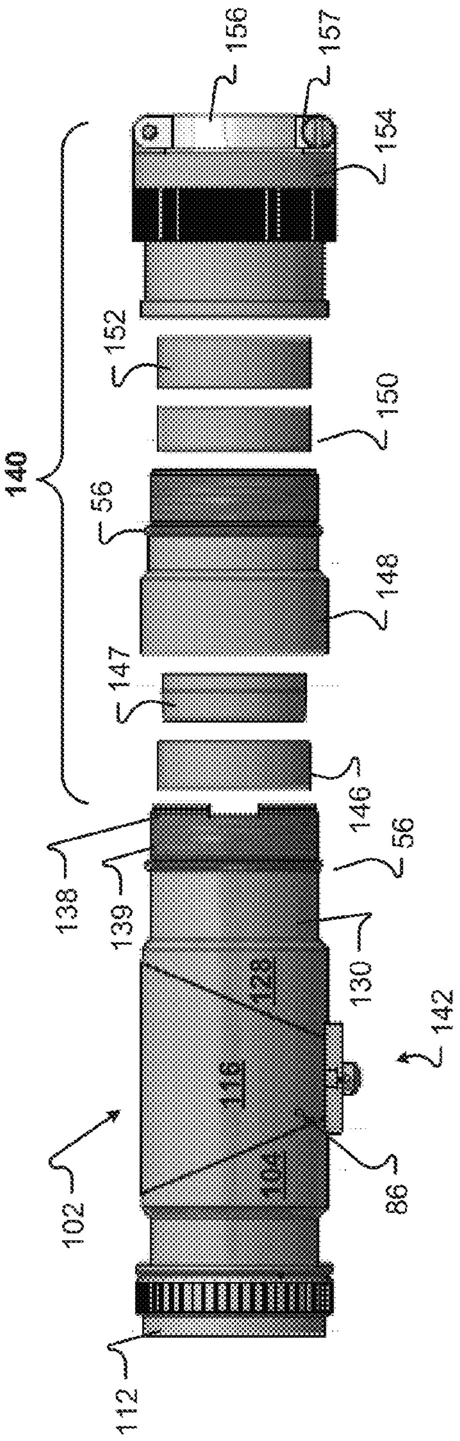
FIG. 12 is an exploded view of the cable assembly backshell of FIG. 8 with a copper cable terminator.

FIG. 12 illustrates an exploded view of one embodiment of the cable assembly backshell 102 of the present invention with a copper cable terminator 140. The cable terminator 140 includes a first ring 146 and a second ring 147, a threaded connector 148 with threads formed on an interior surface on an end proximate the sixth end 138 and threads formed on an exterior surface portion on an end distal of the connector 148, a third ring 150 and a fourth ring 152, and a terminator end piece 154 with threads formed on an interior surface portion on an end proximate the sixth end 138. The terminator end piece 154 includes a clamp 156 that can be tightened by turning a screw 157. The terminator end piece 154 includes a clamp 156 that can be tightened by turning a screw 157. A threaded portion 139 is formed on an exterior surface of the third cylindrical body 130 proximate the sixth end 138.

Figure 13:
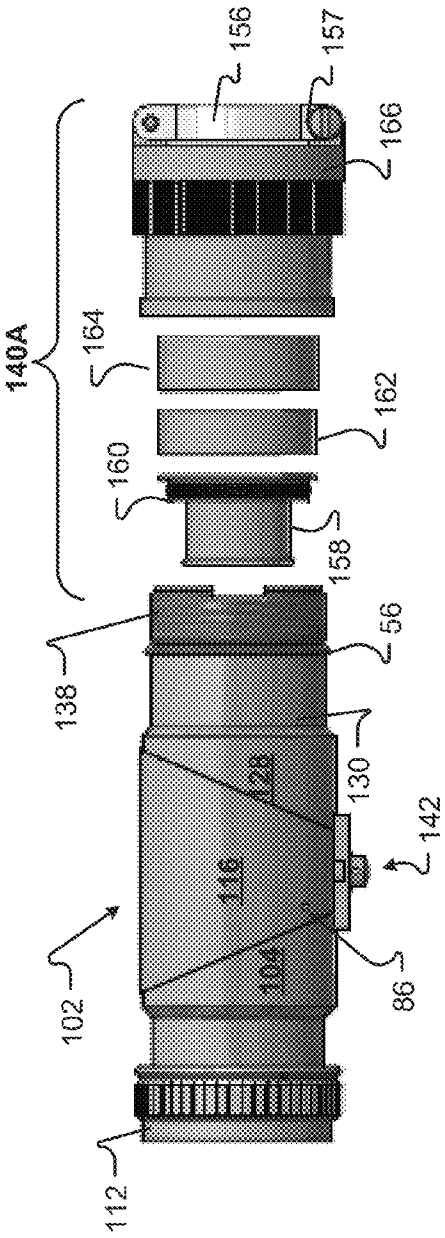
FIG. 13 is an exploded view of the cable assembly backshell of FIG. 8 with one embodiment of a cable terminator.

A cable assembly backshell 102 with a cable terminator 140A of another embodiment of the present invention is illustrated in FIG. 13. The cable terminator 140A has a flanged spacer 158, a flexible ring 160, a first ring 162, a second ring 164, and an end piece 166 with internal threads adapted to engage the threaded portion 139 of the sixth end 138 of the cable entry piece 128. The end piece 166 includes a clamp 156 that can be adjusted by turning a screw 157.

A section view of one embodiment of the cable assembly backshell 102 of the present invention is illustrated in FIG. 14A. A locking mechanism 142 is illustrated in an unlocked position. The locking mechanism includes a threaded hole 170 in the second cylindrical body 118 of the union piece 116. A retaining ring 172 is formed on the second cylindrical body 118 centered on the threaded hole 170. A fastener 167 has a shaft 168 with threads adapted to threadably engage threads of the threaded hole 170. A ring or protrusion 173 is formed on the shaft 168 of the fastener 167. The protrusion 173 on the shaft 168 of the fastener 167 has a larger diameter than the retaining ring 172 and the fastener 167 is secured to the second cylindrical body 118 of the union piece 116.

A head 169 is formed at an exterior end of the cylindrical shaft 168 of the fastener 167. The head 169 of the fastener 167 secures a locking knob 174 to the union piece 116. The locking knob 174 has two extensions 176. When the fastener 167 is unthreaded from the hole 170, as illustrated in FIG. 14A, the locking mechanism 142 is in the unlocked position and the locking knob 174, first rotatable joint 122, and the second rotatable joint 134 can rotate freely. Rotating the fastener 167 into the threaded hole 170, as illustrated in FIG. 14B causes the extensions 176 of the locking knob 174 to fit into the grooves 144 of the cable entry piece 128 and the connector piece 104, preventing the locking knob 174, first rotatable joint 122, and second rotatable joint 134 from rotating.

FIG. 14A also illustrates an extension 178 formed at the second end 114 of the connector piece 104. The cable entry piece 128 also has an extension 180 at the fifth end 136. Grooves 182 are formed in an interior surface of the second cylindrical body 118 of the union piece 116 to retain a ball bearing 184. The extensions 178, 180 of the connector piece 104 and the cable entry piece 128 are retained in the union piece 116 by wires positioned in semi-circular grooves 186 formed in the extensions 178, 180 and corresponding semi-circular grooves 188 formed in the union piece 116. The wires are installed through a hole 86 (illustrated in FIGS. 12, 13) formed in the second cylindrical body 118 of the union piece 116. The wires may be formed of stainless steel or any other material known in the art. FIG. 14A also illustrates the smooth interior surfaces of the backshell 102. The first hollow interior, first rotatable joint 122, second hollow interior, second rotatable joint 134, and the third hollow interior all have smooth interior surfaces with no sharp edges.

Similar to the embodiment discussed above in conjunction with FIG. 7A, the cable assembly backshell 102 includes a plurality of conductors (not illustrated) positioned adjacent to each of the o-rings 56 to provide conductivity between each of the parts of the cable assembly backshell 102. The plurality of conductors are adapted to provide electrical bonding between the cable connector 112, the connector piece 104, the union piece 116, the cable entry piece 128, and the cable terminator 140. The plurality of conductors may be formed of any material and in any shape or size selected to provide electrical conductivity. In one embodiment the plurality of conductors are sliding springs.

Figure 15A:
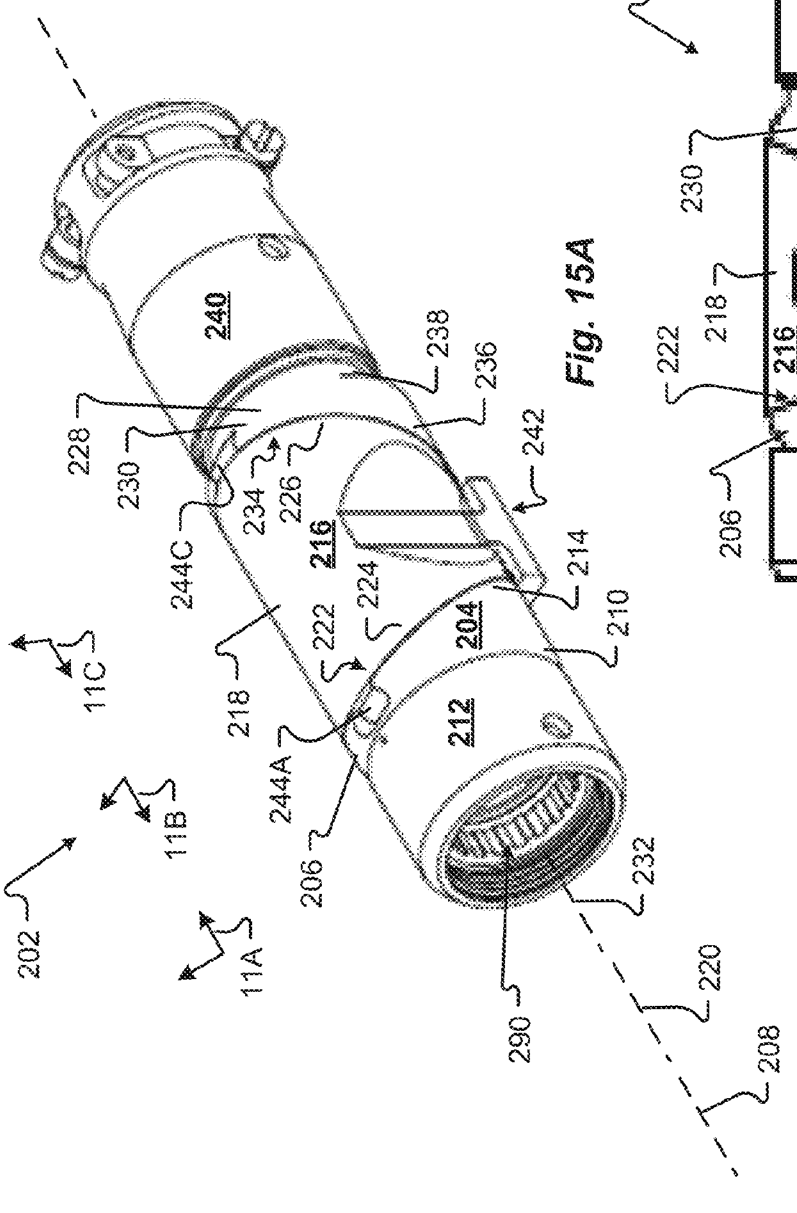
FIG. 15A is an isometric view of a cable assembly backshell according to yet another embodiment of the present invention in a straight configuration.

FIGS. 15A-19 illustrate still another embodiment of a rotatable cable assembly backshell 202 of the present invention. Turning now to FIGS. 15A, 15B, two views of a backshell 202 are illustrated. Similar to the embodiments discussed above, the backshell 202 has a connector piece 204, a first generally cylindrical body 206 extending generally along a first longitudinal axis 208, and a first hollow interior. A first end 210 is interconnected to a cable connector 212. The first end 210 is oriented at an angle 11A of approximately 90° to the first longitudinal axis 208. A second end 214 of the connector piece 204 is oriented at an angle 11B of approximately 67.5° to the first longitudinal axis 208.

Figure 18A:
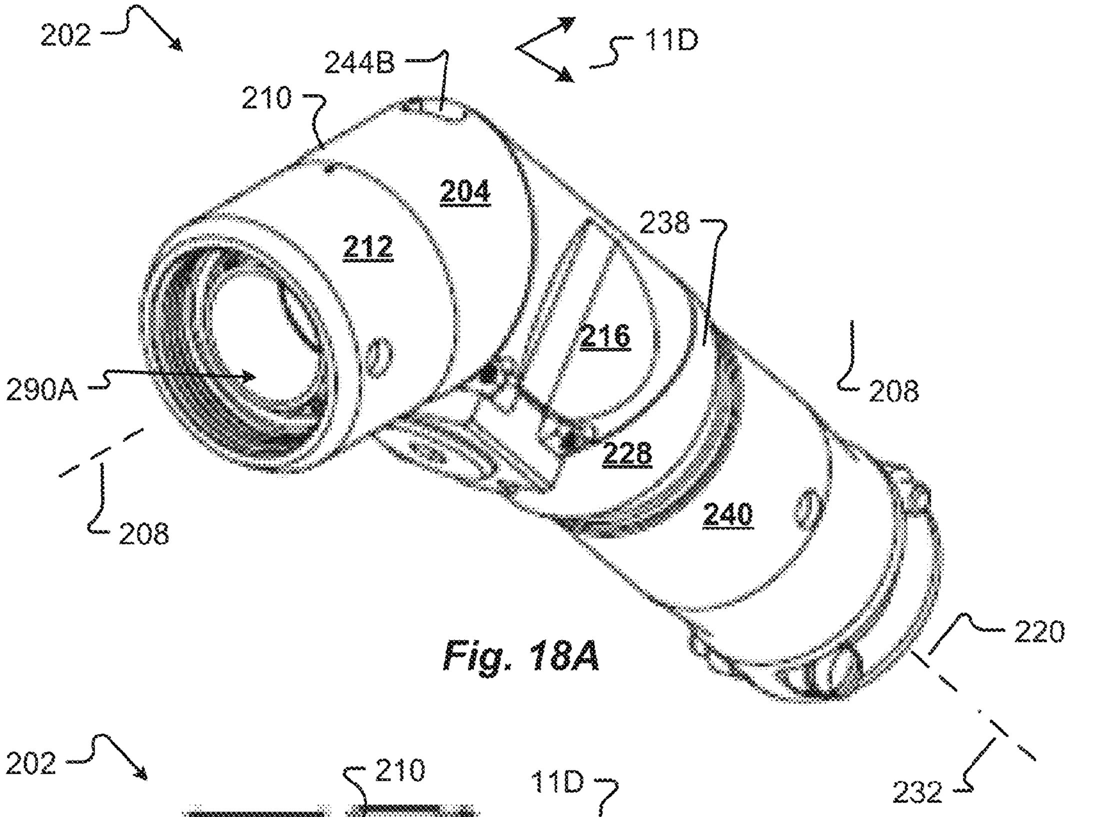
FIG. 18A is an isometric view of the cable assembly backshell of FIG. 15A in a second 45° configuration.

One of skill in the art will appreciate that the cable connector 212 can be incorporated into the connector piece 204 without departing from the scope of the present invention. The cable assembly backshell 202 may be interconnected to a fiber optic cable connector or a copper cable connector. In one embodiment, a cable connector adapted to work with either a fiber optic cable or a copper cable may be interconnected to the backshell 202. FIG. 15A illustrates a cable adapter 290 of one embodiment of the present invention interconnected to the cable connector 212. Cable adapters 290 of different configurations adapted to function with cables of different sizes and/or different types (such as fiber optic cables or copper cables) may be interconnected to the cable connector 212 of the present invention as illustrated in FIG. 18A. Cable adapters 290 are described in more detail in conjunction with FIG. 19.

Figure 15B:
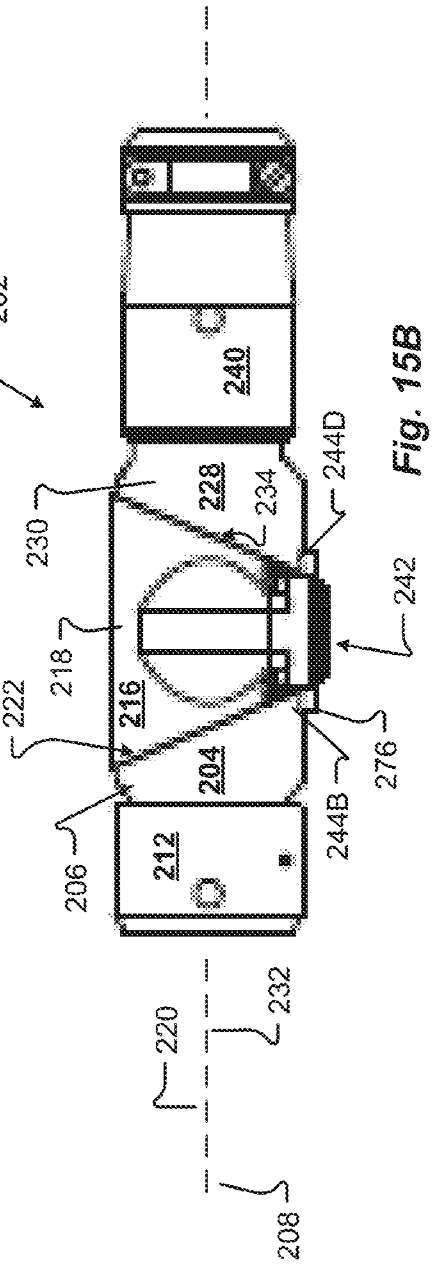
FIG. 15B is a front elevation view of the cable assembly backshell of FIG. 15A.

The backshell 202 has a union piece 216 comprising a second generally cylindrical body 218 with a second hollow interior generally extending along a second longitudinal axis 220, which in the configuration illustrated in FIGS. 15A, 15B corresponds with the first longitudinal axis 208. The union piece 216 has a third end 224 oriented at an angle 11B of approximately 67.5° to the second longitudinal axis 220. The third end 224 is interconnected to the second end 214 of the connector piece 204 at a first rotatable joint 222. The union piece 216 has a fourth end 226 oriented at an angle 11C of approximately 112.5° to the second longitudinal axis 220.

A cable entry piece 228 having a third generally cylindrical body 230 and a third hollow interior generally extending along a third longitudinal axis 232 is interconnected to the union piece 216 at a second rotatable joint 234. In this configuration, the third longitudinal axis 232 corresponds with the first longitudinal axis 208 and the second longitudinal axis 220. The third cylindrical body 230 has a fifth end 236 oriented at an angle 11C of approximately 112.5° to the third longitudinal axis 232. The fifth end 236 is interconnected to the fourth end 226 of the union piece 216 at the second rotatable joint 234. The third cylindrical body 230 has a sixth end 238 oriented at an angle 11A of approximately 90° to the third longitudinal axis 232. The sixth end 238 is interconnected to a cable terminator 240. All interior surfaces of the cable assembly backshell 202, including the first hollow interior, first rotatable joint 222, second hollow interior, second rotatable joint 234, and the third hollow interior, are smooth and present no sharp edges that could damage a cable.

As appreciated by one of skill in the art, the cable terminator 240 and the cable entry piece 228 can be combined to form one cable entry piece 228 without departing from the scope of the present invention. The cable assembly backshell 202 may be interconnected to a fiber optic cable terminator or a copper cable terminator. In one embodiment, the backshell 202 is interconnected to a cable terminator adapted to work with either a fiber optic cable or a copper cable.

The first cylindrical body 206 of the connector piece 204 has two diametrically opposed grooves 244A and 244B to receive extensions 276 of the locking mechanism 242. Two more diametrically opposed grooves 244C and 244D are formed in the third cylindrical body 230 of the cable entry piece 228. The extensions 276 of the locking mechanism 242 fit into the grooves 244 when the locking mechanism 242 is positioned in a locked configuration as illustrated in FIG. 15B. Optionally, additional grooves 244 may be formed in the first cylindrical body 206 and the third cylindrical body 230 to enable the locking mechanism 242 to lock the connector piece 204 and the cable entry piece 228 in additional angular configurations. In one embodiment of the present invention, grooves 244 are formed approximately every 15° around the exterior circumferences of the first cylindrical body 206 and the third cylindrical body 230 to enable the cable entry piece 228 and the connector piece 204 to be locked in a plurality of angular configurations.

As discussed above with respect to other embodiments of the present invention, the exterior surfaces of the cable assembly backshell 202 are coated to protect the surfaces from damage caused by exposure to adverse environmental conditions. The coatings may comprise metallic plating on exterior surfaces of the bodies 206, 218, 230 of the connector piece 204, union piece 216, and the cable entry piece 228, respectively. Alternatively, a sealant may be applied to coat the exterior surfaces. Seals are provided between all joints of the backshell 202. The seals may comprise o-rings to seal the first and second rotatable joints 222, 234, the interconnections between the connector piece 204 and the cable connector 212 and between the cable entry piece 228 and the cable terminator 240. The plating and the seals provide a barrier that protects the cable assembly backshell 202 from moisture, salt spray, and infiltration by dust or other foreign objects and contaminants.

In addition, the cable assembly backshell 202 has electrical bonding between the cable connector 212, the connector piece 204, the union piece 216, the cable entry piece 228, and the cable terminator 240. The electrical bonding protects the backshell 202 and electrical components it is interconnected to from radio frequency interference and provides electrical grounding across all components of the backshell 202. A plurality of conductors (not illustrated) are positioned adjacent to o-rings 56 at each joint of the cable assembly backshell 202 to provide conductivity between the each part of the cable assembly backshell 202. The plurality of conductors are adapted to provide electrical bonding between the cable connector 212, the connector piece 204, the union piece 216, the cable entry piece 228, and the cable terminator 240. The plurality of conductors may be formed of any material and in any shape or size selected to provide electrical conductivity. In one embodiment the plurality of conductors are sliding springs.

Figure 16A:
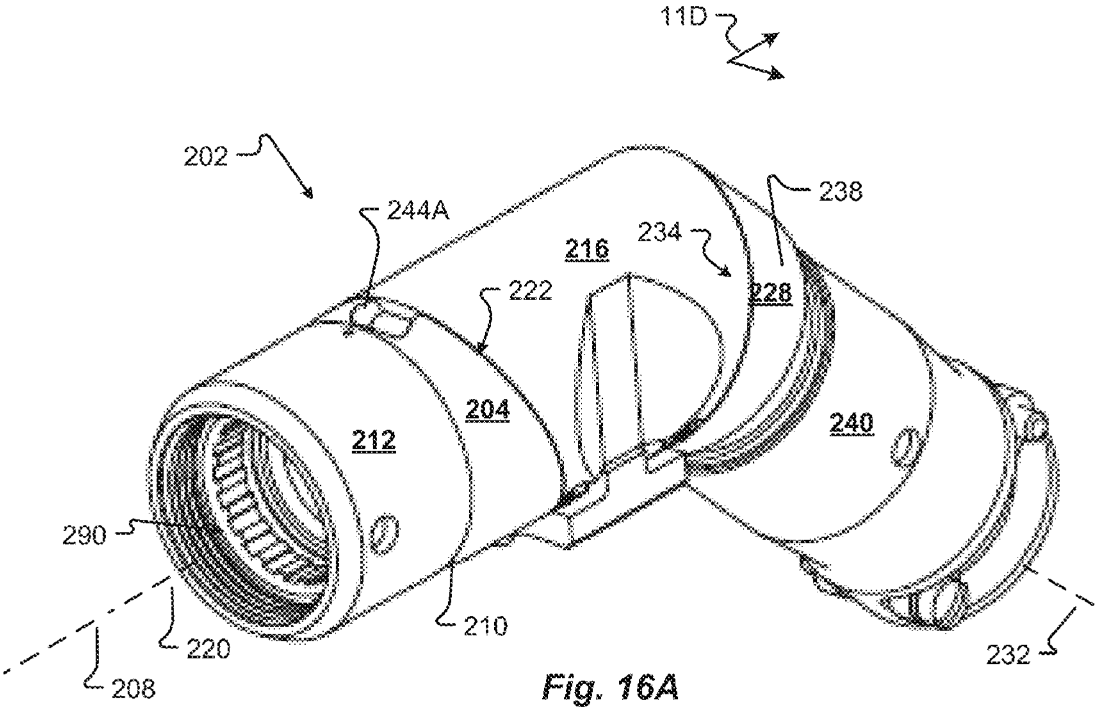
FIG. 16A is an isometric view of the cable assembly backshell of FIG. 15A in a first 45° configuration.
Figure 16B:
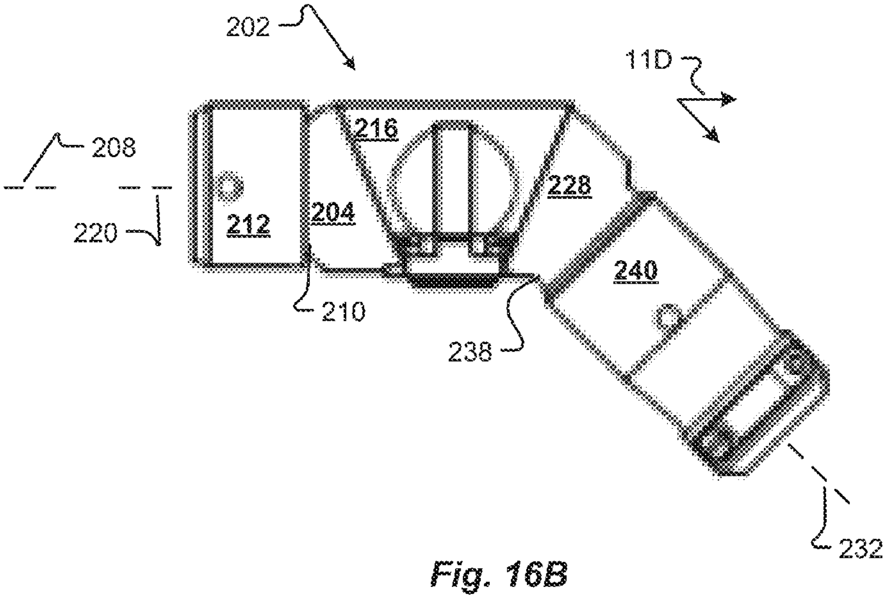
FIG. 16B is a front elevation view of the cable assembly backshell of FIG. 16A.

The joints 222, 234 allow the cable assembly backshell 202 to be aligned in four configurations. A straight configuration is illustrated in FIGS. 15A, 15B where the first longitudinal axis 208, the second longitudinal axis 220, and the third longitudinal axis 232 are coincident. The cable assembly backshell 202 of the present invention is illustrated in a first 45° configuration in FIGS. 16A, 16B in which the connector piece 204 and the union piece 216 are in the same angular relationship as illustrated in FIGS. 15A, 15B and the first longitudinal axis 208, and the second longitudinal axis 220 are coincident. In FIGS. 16A, 16B, the cable entry piece 228 has been rotated approximately 180° about the first longitudinal axis 208 which positions the third longitudinal axis 232 at an angle 11D approximately 45° clockwise relative to the first longitudinal axis 208. The first end 210 is oriented at an angle 11D of approximately 45° to the sixth end 238.

Figure 17A:
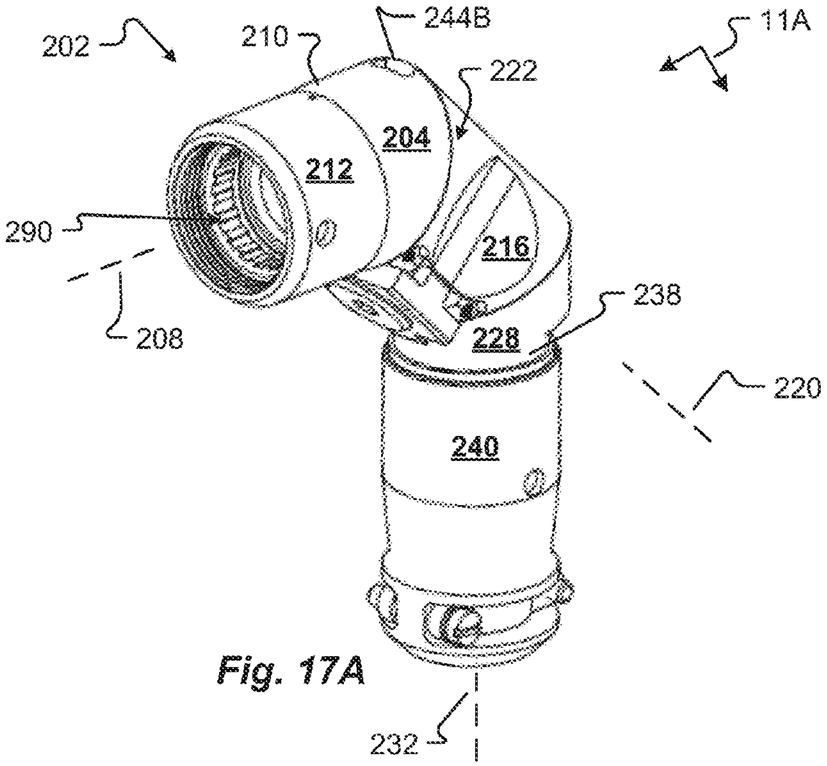
FIG. 17A is an isometric view of the cable assembly backshell of FIG. 15A in a 90° configuration.
Figure 17B:
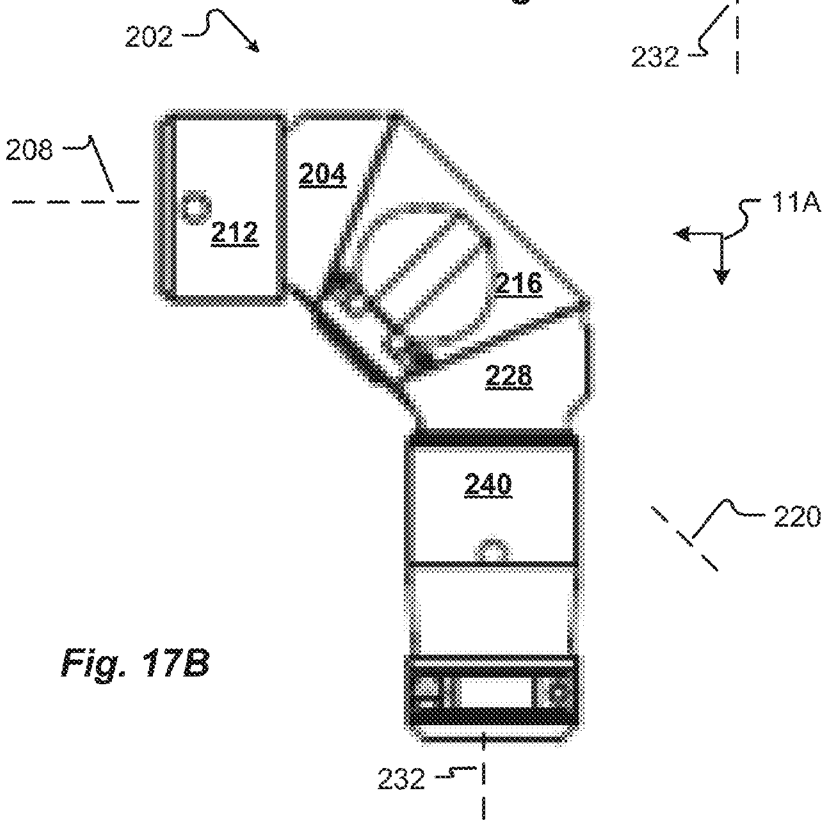
FIG. 17B is a front elevation view of the cable assembly backshell of FIG. 17A.

The backshell 202 of the present invention is illustrated in a 90° configuration in FIGS. 17A, 17B wherein the union piece 216 and the cable entry piece 228 are in the same orientation to each other as illustrated in FIGS. 16A, 16B and the third longitudinal axis 232 is angled approximately 45° from the second longitudinal axis 220. The connector piece 204 has been rotated 180° about the second longitudinal axis 220, orienting the first end 210 at an angle 11A of approximately 90° to the sixth end 238.

Figure 18B:
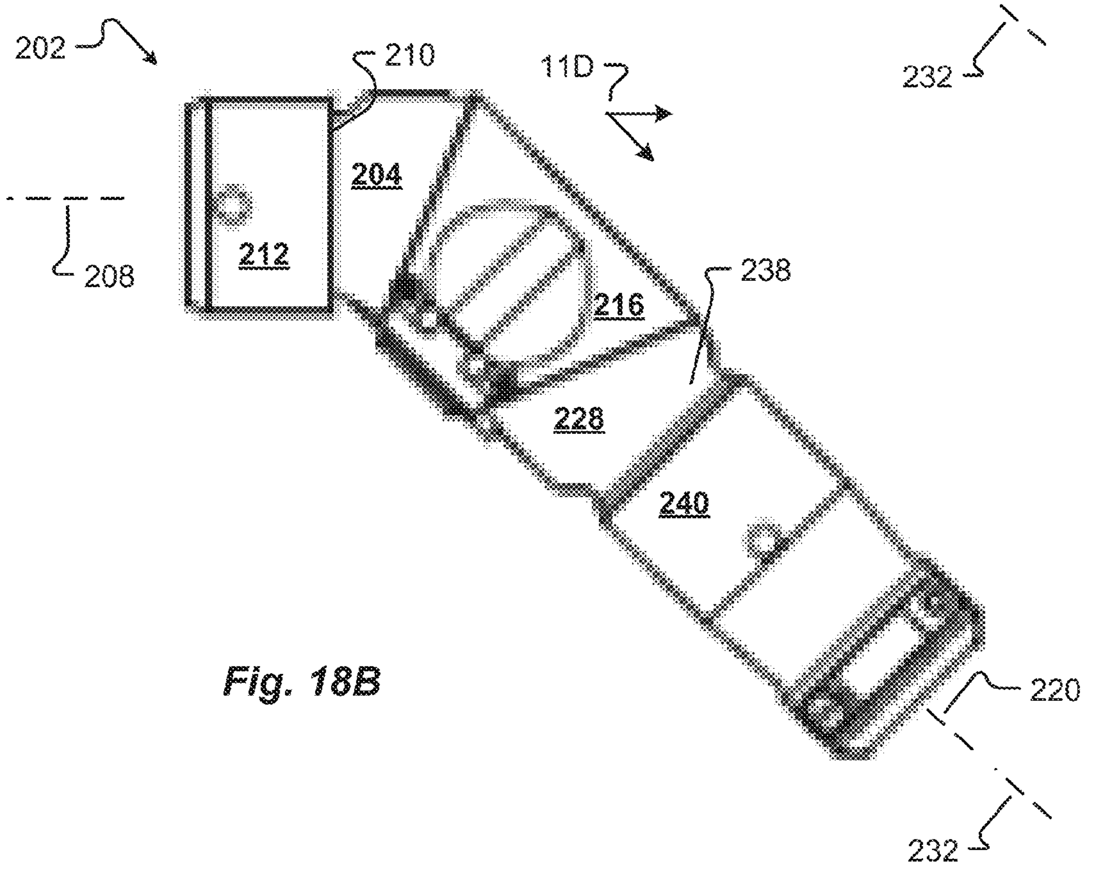
FIG. 18B is a front elevation view of the cable assembly backshell of FIG. 18A.

A second 45° configuration of the cable assembly backshell 202 in accordance with embodiments of the present invention is illustrated in FIGS. 18A, 18B. The connector piece 204 is in the same orientation regarding the union piece 216 as illustrated in FIGS. 17A, 17B. However, the cable entry piece 228 has been rotated 180° back to the position of the cable entry piece 228 illustrated in FIGS. 15A, 15B, orienting the first end 210 at an angle 11D of approximately 45° to the sixth end 238. Another embodiment of a cable adapter 290A of the current invention is illustrated in FIG. 18A.

Figure 19:
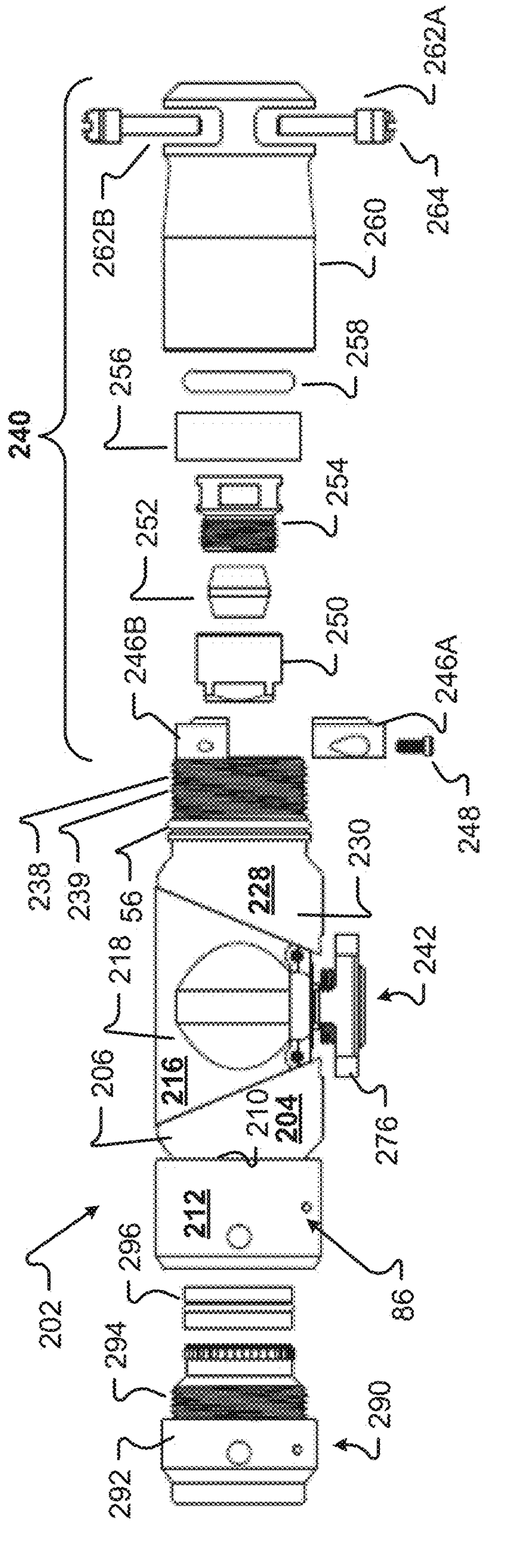
FIG. 19 is an exploded view of the cable assembly backshell of FIG. 15A.

FIG. 19 illustrates an exploded view of one embodiment of the cable assembly backshell 202 of the present invention. The locking mechanism 242 is in an unlocked position with the extensions 276 extracted from the grooves 244 formed in the first cylindrical body 206 and the third cylindrical body 230. A threaded portion 239 formed on an exterior surface of the third cylindrical body 230 is illustrated proximate the sixth end 238.

The cable terminator 240 illustrates a telescoping embodiment that facilitates access to the cable. The cable terminator 240 includes a collar 246A, 246B that is secured with a closure 248, a first cylinder 250 with internal threads at the end distal from the sixth end 238, a first spacer 252, a second spacer 254 with threads formed on an exterior surface on an end proximate the sixth end 238, a ring 256, a flexible ring 258, and a terminator end piece 260 with threads formed on an interior surface portion on an end proximate the sixth end 238. The terminator end piece 260 includes clamps 262A, 262B that can be tightened by turning a screw 264. The terminator end piece 154 includes a clamp 156 that can be tightened by turning a screw 157. A threaded portion 139 is formed on an exterior surface of the third cylindrical body 130 proximate the sixth end 138. The cable terminator 240 is adapted to interconnect to either a fiber optic cable or a copper cable. In one embodiment, the cable terminator is adapted to interconnect to both Kevlar reinforced fiber optic cable and shielded copper cable that meet military design specifications.

FIG. 19 also illustrates a cable adapter 290 of one embodiment of the present invention. The cable adapter 290 has a hollow, generally cylindrical body 292. Threads 294 are formed on an exterior portion of the body 292 to threadably engage threads formed on an interior surface of the cable connector 212. A spacer 296 fits between the cable adapter 290 and the cable connector 212. The cable adapter 290 is adapted to interconnect to either a fiber optic cable or a copper cable. In one embodiment, the cable adapter is adapted to interconnect to both Kevlar reinforced fiber optic cable and shielded copper cable that meet military design specifications. In another embodiment, the cable adapter 290 is designed to meet military specifications for commonality, reliability and to interconnect to receptacles of various sizes and configurations. Another embodiment of a cable adapter 290A of the current invention is illustrated in FIG. 18A. Optionally, cable adapter 90 or 190 may be interconnected to cable connector 212.

As previously described in conjunction with FIGS. 7A and 14A, the cable assembly backshell 202 has an extension at the fifth end 236 of the cable entry piece 228. Grooves are formed in an interior surface of the second cylindrical body 218 of the union piece 216 to retain a ball bearing. Extensions of the connector piece 204 and the cable entry piece 228 are retained in the union piece 216 by wires positioned in grooves formed in the extensions and corresponding grooves formed in an interior surface of the union piece 216. The wires are installed through a hole 86 formed in the second cylindrical body 218 of the union piece 216. The wires may be formed of stainless steel or any other material known in the art.

The cable assembly backshells 2, 102, 202 of all embodiments may be interconnected to any of the cable connectors 12, 112, 212 and/or cable terminators 40, 40A, 140, 140A, and 240 in any combination. For example, in one embodiment, cable assembly backshell 202 is interconnected to cable connector 12 and cable terminator 40. In another embodiment, cable assembly backshell 202 is interconnected to cable connector 12 and cable terminator 40A. In still another embodiment, cable connector 112 and cable terminator 140 are interconnected to cable assembly backshell 202. In yet another embodiment, cable connector 112 and cable terminator 140A are interconnected to cable assembly backshell 202.

While various embodiments of the present invention have been described in detail, it is apparent that modifications and alterations of those embodiments will occur to those skilled in the art. However, it is expressly understood that such modifications and alterations are within the scope and spirit of the present disclosure. Further, the invention(s) described herein are capable of other embodiments and of being practiced or of being carried out in various ways. In addition, it is to be understood that the phraseology and terminology used herein is for the purpose of description and should not be limiting. Using "including," "comprising," or "adding" and variations herein are meant to encompass the items listed thereafter and equivalents thereof, and, additional items.

What is claimed is:

1. A rotatable cable assembly backshell, comprising:

a connector piece having a first body with a first end and a second end, the first end oriented at an angle of approximately 90 degrees to the first body and the second end oriented at a predetermined angle that is not orthogonal to the first body;

a union piece having a second body with a third end and a fourth end, the third and fourth ends oriented at predetermined angles that are not orthogonal to the second body, the third end interconnected to the second end of the connector piece by a first rotatable joint; and a cable entry piece having a third body with a fifth end and a sixth end, the fifth end oriented at a predetermined angle that is not orthogonal to the third body, the fifth end interconnected to the fourth end of the union piece by a second rotatable joint, the sixth end oriented at an angle of approximately 90 degrees to the third body, wherein by rotating at least one of the connector piece and the cable entry piece, the first end can be oriented at an angle of each of approximately 0 degrees, approximately 45 degrees, and approximately 90 degrees with respect to the sixth end.

2. The rotatable cable assembly backshell of claim 1, wherein the first end is adapted to interconnect with a cable connector and the sixth end is adapted to interconnect to a cable terminator.

3. The rotatable cable assembly backshell of claim 1, wherein the backshell is environmentally protected to withstand salt spray.

4. The rotatable cable assembly backshell of claim 3, further comprising:

plating on exterior surfaces of the connector piece, the union piece, and the cable entry piece; and o-rings to seal the first and second rotatable joints.

5. The rotatable cable assembly backshell of claim 1, further comprising electrical bonding between the connector piece, union piece, cable entry piece, and the first and second rotatable joints, the electrical bonding adapted to protect electrical components to which the cable assembly backshell is interconnected from radio frequency interference.

6. The rotatable cable assembly backshell of claim 1, further comprising a locking mechanism to prevent inadvertent rotation of at least one of the connector piece and the cable entry piece relative to the union piece.

7. The rotatable cable assembly backshell of claim 6, wherein the locking mechanism comprises:

a first pair of diametrically opposed grooves adjacent to the second end of the first body of the connector piece;

a second pair of diametrically opposed grooves adjacent to the fifth end of the third body of the cable entry piece;

a hole in the second body of the union piece;

a retaining ring on the second body of the union piece, the retaining ring substantially centered on the hole, the retaining ring having an interior diameter;

a fastener having a shaft with a protrusion, the protrusion adapted to engage a slot in the hole to interconnect the fastener to the union piece, the protrusion having an exterior diameter, wherein the exterior diameter is greater than the interior diameter of the retaining ring and the fastener is secured to the union piece by the retaining ring and the protrusion; and a locking knob interconnected to the shaft of the fastener, wherein the connector piece and the cable entry piece can rotate freely relative to the union piece when the protrusion of the fastener is disengaged from the slot in the hole, wherein when the protrusion of the fastener is engaged in the slot in the hole, the locking knob fits into one of the first pair of diametrically opposed grooves of the connector piece and one of the second pair of diametrically opposed grooves of the cable entry piece thereby preventing the first rotatable joint and the second rotatable joint from rotating.

8. The rotatable cable assembly backshell of claim 1, wherein the predetermined angles of the second end and the third end are adapted to enable the first body to be oriented at angles of each of approximately 0 degrees and approximately 45 degrees with respect to the second body when the connector piece is rotated around the first rotatable joint, and wherein the predetermined angles of the fourth end and the fifth end are adapted to enable the third body to be oriented at angles of each of approximately 0 degrees and approximately 45 degrees with respect to the second body when the cable entry piece is rotated around the second rotatable joint.

9. The rotatable cable assembly backshell of claim 1, wherein each of the first, second, and third bodies are at least partially hollow with substantially smooth interior surfaces.

10. The rotatable cable assembly backshell of claim 1, wherein the connector piece can rotate up to about 180 degrees with respect to the union piece and the cable entry piece can rotate up to about 180 degrees with respect to the union piece.

11. A method of forming a rotatable cable assembly backshell, comprising:

forming a connector piece having a first body with a first end and a second end, the first end oriented at an angle of approximately 90 degrees to the first body and the second end oriented at a predetermined angle that is not orthogonal to the first body;

forming a union piece having a second body with a third end and a fourth end, the third and fourth ends oriented at predetermined angles that are not orthogonal to the second body;

forming a cable entry piece having a third body with a fifth end and a sixth end, the fifth end oriented at a angle that is not orthogonal to the third body and the sixth end oriented at an angle of approximately 90 degrees to the third body;

interconnecting the second end of the connector piece to the third end of the union piece thereby forming a first rotatable joint; and interconnecting the fourth end of the union piece to the fifth end of the cable entry piece thereby forming a second rotatable joint, wherein by rotating at least one of the connector piece and the cable entry piece, the first end can be oriented at angles of each of approximately 0 degrees, approximately 45 degrees, and approximately 90 degrees with respect to the sixth end.

12. The method of claim 11, further comprising interconnecting the first end of the connector piece to a cable connector.

13. The method of claim 12, further comprising interconnecting the sixth end of the cable entry piece to a cable terminator.

14. The method of claim 11, further comprising selecting the predetermined angles of the second end and the third end to enable the first body to be oriented at angles of each of approximately 0 degrees and approximately 45 degrees with respect to the second body when the connector piece is rotated around the first rotatable joint, wherein the connector piece can rotate up to about 180 degrees with respect to the union piece.

15. The method of claim 11, further comprising selecting the predetermined angles of the fourth end and the fifth end to enable the third body to be oriented at angles of each of approximately 0 degrees and approximately 45 degrees with respect to the second body when the cable entry piece is rotated around the second rotatable joint, wherein the cable entry piece can rotate up to about 180 degrees with respect to the union piece.

16. The method of claim 11, further comprising forming a locking mechanism interconnected to the union piece, the locking mechanism operable to prevent inadvertent rotation of at least one of the connector piece and the cable entry piece relative to the union piece.

17. A method of interconnecting a cable to an electrical component, the method comprising:

providing a rotatable cable assembly backshell, the rotatable cable assembly backshell comprising: a connector piece having a first end and a second end; a union piece having a third end and a fourth end, the third end interconnected to the second end of the connector piece at a first rotatable joint; and a cable entry piece having a fifth end and a sixth end, the fifth end interconnected to the fourth end of the union piece at a second rotatable joint;

interconnecting the sixth end of the cable entry piece to a cable terminator associated with the cable;

interconnecting a selected cable connector to the first end of the connector piece;

positioning the rotatable cable assembly backshell adjacent to a receptacle of the electrical component;

inserting the selected cable connector into the receptacle of the electrical component; and rotating the connector piece and the cable entry piece relative to the union piece to a predetermined angle.

18. The method of claim 17, wherein interconnecting the sixth end of the cable entry piece to the cable terminator associated with the cable comprises selecting a copper cable terminator or a fiber optic cable terminator to interconnect to the sixth end, and wherein interconnecting the selected cable connector to the first end of the connector piece comprises selecting a copper cable connector or a fiber optic cable connector to interconnect to the first end.

19. The method of claim 17, further comprising engaging a lock of the rotatable cable assembly backshell.

20. The method of claim 17, wherein the predetermined angle is one of approximately 0 degrees, approximately 45 degrees, and approximately 90 degrees.

* * * * *